US012617112B2

(12) United States Patent
LaRocca

(10) Patent No.: US 12,617,112 B2
(45) Date of Patent: May 5, 2026

(54) HANDHELD CUTTING DEVICE AND SYSTEM FOR CUTTING SHEET GOODS

(71) Applicant: Jacob LaRocca, Somerville, MA (US)

(72) Inventor: Jacob LaRocca, Somerville, MA (US)

( * ) Notice: Subject to any disclaimer, the term of this patent is extended or adjusted under 35 U.S.C. 154(b) by 297 days.

(21) Appl. No.: 18/337,007

(22) Filed: Jun. 18, 2023

(65) Prior Publication Data

US 2024/0416542 A1 Dec. 19, 2024

(51) Int. Cl.
*B26B 29/06* (2006.01)
*B26B 5/00* (2006.01)

(52) U.S. Cl.
CPC .............. *B26B 29/06* (2013.01); *B26B 5/002* (2013.01); *B26B 5/003* (2013.01)

(58) Field of Classification Search
None
See application file for complete search history.

(56) References Cited

U.S. PATENT DOCUMENTS 2,924,010 A * 2/1960 Umholtz ................ G03D 15/04 30/294
4,158,977 A 6/1979 Logan
4,903,409 A * 2/1990 Kaplan ................... B26B 5/005 30/294
5,471,753 A * 12/1995 Rodrigues ............... B26B 29/06 33/485
6,052,909 A * 4/2000 Gardner .................. B26B 29/06 30/310
6,629,370 B1 * 10/2003 Sposato .................. B26B 29/06 33/32.2
7,481,001 B1 * 1/2009 Rao .......................... B25H 7/00 33/42
8,567,075 B2 10/2013 Hetts et al.
10,994,428 B2 5/2021 Gallegos et al.
2010/0018062 A1 * 1/2010 Stravitz ................. B26B 25/005 30/287
2024/0416542 A1 * 12/2024 LaRocca ................. B26B 5/002

* cited by examiner

*Primary Examiner* — Hwei-Siu C Payer
(74) *Attorney, Agent, or Firm* — Gillis Patent Law, LLC; John Gillis

(57) ABSTRACT

A handheld cutting device and system for cutting sheet goods is disclosed. The device includes a base and a grip. The base includes a bottom portion that sits on a top surface of the goods and a boss that is atop the bottom portion. The grip is rotatably attached to the boss, holds a blade that extends towards the top surface of the goods, and includes a blade holding mechanism that adjustably secures the blade at a desired depth relative to the top surface of the goods. The grip rotates relative to the base to provide beveled cuts in the goods at angles in ranges from about (−) 75 degrees to 0 degrees and from 0 degrees to about (+) 75 degrees relative to the top surface of the goods. A system including the cutting device and a guide tool also provides guided straight and circular cuts in the goods.

10 Claims, 18 Drawing Sheets

HANDHELD CUTTING DEVICE AND SYSTEM FOR CUTTING SHEET GOODS

BACKGROUND OF THE INVENTION

Users such as artists, photographers, model makers and sculptors commonly use cutting tools to cut substantially flat materials known as sheet goods. These existing cutting tools include handheld devices such as hobby style knives and mat cutters, and more elaborate apparatus that include rail-based guides, in examples. The sheet goods can be of varying thickness and hardness, and are made from materials such as paper, cardboard, wood pulp, plastic and parchment, cotton, cellulose, cloth (such as textiles), foam or foamed plastics, in examples.

The existing cutting tools are typically used as follows. The sheet goods are generally placed on a flat cutting surface during cutting, where a plane of the surface (and thus a plane of the sheet goods) is typically parallel to the cutting surface. The users then place the cutting tools on top of the goods and draw/pull the tools along the top surface of the goods to accomplish the cutting of the goods.

More details for the handheld devices are as follows. The hobby style knives typically have an elongated, pencil-like handle with a fixed or removable blade at one end, and the user holds the handle in their hand with the blade against the sheet goods during cutting. The mat cutters, in contrast, typically have a flat base with an integrated blade, where the base is placed against the sheet goods/parallel to a plane of the goods during cutting.

The most common cuts are perpendicular and bevel cuts. Perpendicular cuts place the blade along a plane that is perpendicular to the material's surface/to the plane of the goods, and are also known as 0 degree cuts. A bevel cut, or simply known as a bevel, is a cut that is made at an acute angle with respect to the plane that is perpendicular to the plane of the sheet goods. Bevels of +45 degrees (left of the perpendicular plane) and −45 degrees (right of the perpendicular plane) are the most common bevels/bevel cuts.

There are many examples of sheet goods that can be cut with the existing cutting tools. Matboards, in one example, are a common type of sheet goods used with two-dimensional artistic works. The matboards are most often used as a backing board for mounting the artistic works or as a frame for the artworks. The matboard can be made from a variety of materials including paper, cardboard, cotton, cellulose, plastic and foam, in examples. Other types of sheet goods often used in two and three dimensional artistic works and modeling professions include paper backed open cell foam, often called foamboard, closed cell foams, such as ethyl-vinyl-acetate sheets, neoprene sheets, expanded polystyrene sheets, balsa wood sheets, cork board, or plastics in examples. These sheet materials can range in thickness from 0.01 inches to thicker than 0.75 inches.

Foamboard, an open cell foam backed with paper on both sides, is another type of sheet goods used with a number of two dimensional and three-dimensional artistic works. These materials typically have a thickness on the order of 0.125-0.25 inches.

Tools designed to be used with these materials function similarly to matboard cutters as listed above, however they are typically designed to accommodate only a depth of 0.25 inches.

SUMMARY OF THE INVENTION

Some existing cutting tools are compatible with mass manufactured blades, and can make straight cuts in materials at several different depths. However, these cutting tools do not allow curved cuts, cuts other than 0 degrees, or require a separate rail-based guide to make straight cuts with a fixed bevel of 45 degrees only. In addition, the surface area of the material that these cutting tools can cut is often quite small, leading to poor ergonomics, as well as instability during cuts that require the user to apply more downward pressure.

Other existing cutting tools can provide beveled cuts without an additional guide, but these tools can provide cuts of 45 degrees only, or both 0 degree and 45 degree beveled cuts only. In one example, a cutting tool is designed to accept blade handles of hobby knives that can be held securely in its blade holder apparatus, where the handles have substantially flat, parallel sides. While this tool can provide both 0 and 45 degree cuts, the tool is cumbersome, with protruding hardware and edges that could easily catch/snag on softer materials, the result of which prohibits curved cuts in these materials. Another example is U.S. Pat. No. 4,158,977 for a common "Logan" mat cutter that accepts razor blades or custom blades and is designed to cut bevels of 45 degrees only.

The aforementioned exemplary sheet goods cutting tools suffer from one or more of the following disadvantages. In one example, many require a custom or non-standard blade, resulting in limited use if the blades become difficult to procure or production is stopped altogether. In another example, the angle of the cut is typically fixed and limited to 0 degree cuts and a bevel of either +45 degrees or −45 degrees. In another example, the blade depths are often not adjustable. In yet another example, each requires an additional guide system such as a separate rail system or a cumbersome track system to guide the cutting tool during cutting. These rail systems and track systems are typically expensive, often costing as much as three times (or more) than the cutting tools themselves. Also, each cutting tool is designed to provide straight cuts only; none can provide curved cuts. Finally, many are expensive to manufacture and maintain because they require custom blade handles and/or blades, and require an additional rail system or track system hardware to function properly.

An improved handheld cutting device and system for cutting a variety of sheet goods is proposed. The cutting device provides bevel cuts at a variety of angles, accepts a wide variety of standard, commercially available blades and blade holders, and incorporates a common mechanism for setting the bevel angle. In embodiments, the cutting device can provide the user with the ability to choose blades that are appropriate for different materials and situations.

In general, according to one aspect, the invention features a cutting device for cutting sheet goods. The cutting device comprises a base and a grip. The base includes a bottom portion and a boss that is atop the bottom portion, where the bottom portion sits on a top surface of the sheet goods. The grip includes a bottom portion that is rotatably attached to the boss, and a grip top portion having a distal end that faces the sheet goods and is located near a front of the base. The grip is configured to rotate relative to the boss along a grip axis that passes through the grip bottom portion and the boss. The grip top portion holds a blade that extends outward from its distal end towards the surface of the sheet goods, and includes a blade holding mechanism to adjustably secure the blade at a desired depth relative to the top surface of the sheet goods.

Preferably, in one example, the grip is configured to rotate with respect to the boss along the grip axis such that the blade provides beveled cuts in the sheet goods at angles in a range from (−) 75 degrees to 0 degrees relative to the top surface of the sheet goods; in another example, the grip is configured to rotate with respect to the boss along the grip axis such that the blade provides beveled cuts in the sheet goods at angles in a range from 0 degrees to (+) 75 degrees relative to the top surface of the sheet goods.

In an embodiment of the cutting device, the grip top portion is configured to receive a knife within a cavity formed within the grip top portion, wherein the knife has a handle to which the blade is attached. The blade holding mechanism adjustably secures the handle within the cavity at a distance relative to the distal end of the grip top portion to adjustably secure the blade at the desired depth relative to the top surface of the sheet goods. Additionally, the grip top portion can include a stop cup at its distal end for capturing the handle, where the stop cup includes a slotted opening through which the blade passes.

In another embodiment of the cutting device, the grip top portion includes a slot along its length that receives the blade and defines a movement path of the blade. The blade holding mechanism adjustably secures the blade within the slot at a distance relative to the distal end of the grip top portion to adjustably secure the blade at the desired depth relative to the top surface of the sheet goods.

In yet another embodiment of the cutting device, the grip top portion has a blade handle channel along its length configured to receive a knife with a body and a retractable blade within the body. Here, the retractable blade is the blade held by the cutting device. The blade holding mechanism adjustably secures the body of the knife within the blade handle channel at a distance relative to the distal end of the grip top portion to adjustably secure the blade at the desired depth relative to the top surface of the sheet goods.

Preferably, the cutting device includes a grip holding mechanism that locks a position of the grip bottom portion relative to the boss for securing the grip to the base. Typically, the grip holding mechanism is a thumb screw that passes through a hole in the boss and has a threaded end that engages with a threaded hole in the grip bottom portion, where the threaded hole, the hole in the boss and the screw are aligned along the grip axis.

In one implementation of the cutting system, the grip bottom portion includes a grip splined surface and the boss includes a base splined surface configured to engage with the grip splined surface. The splined surfaces enable locking rotation of the grip relative to the base, along the grip axis, in fixed degree increments.

Preferably, the cutting device is configured for attachment to a guide tool that enables the cutting device to make guided straight cuts and circular cuts in the sheet goods. In one implementation, the grip bottom portion and the boss form a mechanical joint that enables the grip to rotate relative to the base with respect to the grip axis, and a ball and detent mechanism is included within the mechanical joint that enables locking rotation of the grip relative to the base, along the grip axis, in fixed degree increments.

In general, according to another aspect, the invention features a cutting system for cutting sheet goods. The cutting system includes a cutting device and a guide tool. In more detail, the cutting device includes a base and a grip. The base includes a bottom portion that sits on a top surface of the sheet goods, and includes a boss that is atop the bottom portion. The grip includes a grip bottom portion that is rotatably attached to the boss and a grip top portion attached to the grip top portion.

The grip top portion has a distal end that faces the sheet goods and is configured to hold a blade that extends outward from the distal end towards the top surface of the sheet goods. The grip is configured to rotate with respect to the boss along a grip axis that passes through the grip bottom portion and the boss.

The guide tool is configured for attachment to the base. The guide tool enables the cutting device to make guided straight cuts and circular cuts in the sheet goods.

Preferably, the grip is configured to rotate with respect to the boss along the grip axis such that the blade provides beveled cuts in the sheet goods at angles in a range from (–) 75 degrees to 0 degrees relative to the top surface of the sheet goods, and at angles in a range from 0 degrees to (+) 75 degrees relative to the top surface of the sheet goods. The grip top portion includes a blade holding mechanism to adjustably secure the blade at a desired depth relative to the top surface of the sheet goods.

In one implementation, the grip bottom portion includes a grip splined surface and the boss includes a base splined surface configured to engage with the grip splined surface. The splined surfaces enable locking rotation of the grip relative to the base, along the grip axis, in fixed degree increments. The cutting device also includes a grip holding mechanism that locks a position of the grip bottom portion relative to the boss for securing the grip to the base.

The guide tool includes a flange and a beam. The flange attaches to the base of the cutting device. The beam includes a guide block. The guide block is removably attached to the beam and is oriented substantially perpendicular to the beam along a length of the beam. The beam removably attaches to the flange and extends outward from the flange in a direction such that its length lay parallel to a front plane of the flange.

In this way, in one embodiment of the cutting system, during the cutting of the sheet goods, the blade is positioned along a cut line of the sheet goods, and the guide block is disposed against an edge of the sheet goods that is parallel to the cut line, the result of which enables the cutting system to provide guided straight cuts.

The guide block also includes a pivot. In another embodiment of the cutting system, the pivot is configured relative to the beam such that the pivot faces downward towards the top surface of the sheet goods and is held against the top surface of the sheet goods. An axis of rotation of the cutting system runs substantially vertically through the pivot and is perpendicular to the front plane of the flange, and the cutting system provides guided circular cuts in the sheet goods when the grip is rotated around the axis of rotation of the cutting system.

In yet another embodiment of the cutting system, the cutting system includes a guide rail and the cutting device includes a flange. The guide rail is disposed against a straight edge of the sheet goods, where the straight edge runs parallel to a cut line of the goods, and the guide rail includes a recess along its length that also runs parallel to the cut line. The flange attaches to the base of the cutting device and includes an overhang feature configured for placement in the recess of the guide rail. In this way, during the cutting of the goods, the overhang feature seats within the recess of the guide rail to provide guided straight cuts in the sheet goods.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

It will be understood that although terms such as "first" and "second" are used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
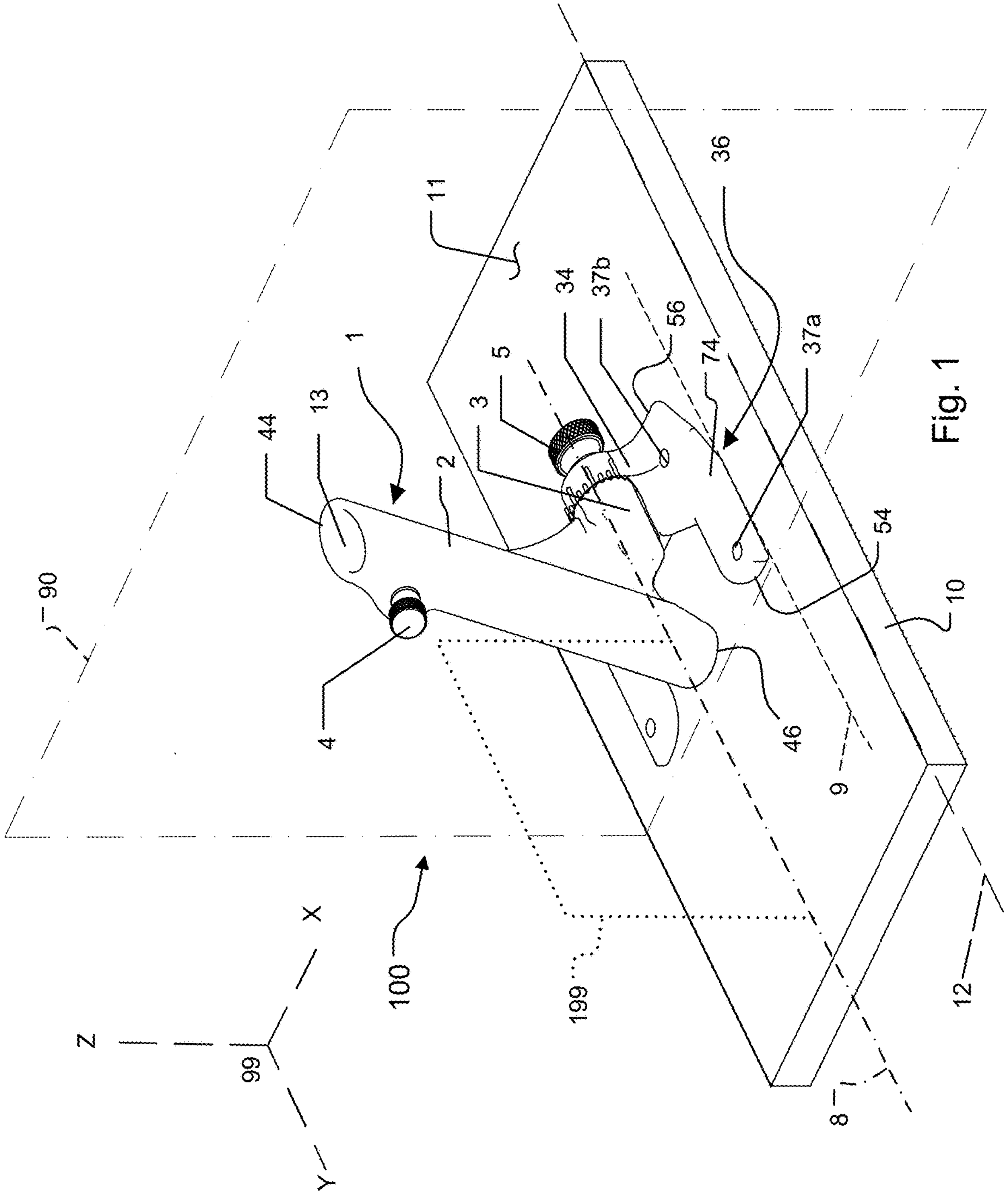
FIG. 1 is an isometric view of an inventive cutting device for making cuts in sheet goods, according to an embodiment, where the cutting device is compatible with standard hobby knives, and where the cutting device includes a universal angle setting base for cutting bevels in the sheet goods over a wide range of angles.

FIG. 1 shows a cutting device 100, according to an embodiment. The cutting device 100 accepts a knife with a handle and an attached blade (not shown) and is designed to cut sheet goods 10.

The cutting device 100 is shown placed upon a top surface 11 of an exemplary instance of sheet goods 10. The instance of sheet goods 10 is placed upon a substantially flat work surface 12 such as a table. A coordinate system 99 with X, Y and Z directions is also shown.

The cutting device 100 includes a base 36 and a grip 1 rotatably attached to the base 36. The base 36 includes a bottom portion 74 and a boss 34. The base 36 has a front 54, a back 56 that opposes the front 54, and the bottom portion 74 has a substantially flat underside surface (not visible in the figure). The boss 34 is atop the base 36 and rises upwards from the back 56 of the base 36.

The grip 1 has a grip bottom portion 3 and a substantially cylindrical grip top portion 2 that slopes upward (i.e., in the Z direction) from the grip bottom portion 3. The grip top portion 2 has a distal end 46 and a proximal end 44 that opposes the distal end 46 and includes a blade holding mechanism 4. The grip 1 also has a blade cavity 13 formed within the grip top portion 2. The blade cavity 13 is open at the proximal end 44 and ends in a blade stop cup (not visible in the figure) at the distal end 46.

More detail for the base 36 is as follows. The bottom surface 26 of the bottom portion 74 rests on the top surface 11 of the sheet goods 10/is designed to be disposed against a top plane of the sheet goods 10 during operation of the cutting device 100. The front 54 is generally "C" shaped or "U" shaped. The boss 34 includes or otherwise incorporates a grip holding mechanism 5. Accessory alignment holes 37*a* and 37*c* provided in the bottom portion 74 are also shown.

The base 36 is generally the same across all embodiments. Because the bottom portion 74 of the base 36 lay parallel to the top plane of the sheet goods 10, the top plane of the sheet goods 10 is also referred to as a plane 9 of the base 36.

A vertical plane 90 is also shown in the figure. The vertical plane 90 runs along the X-axis and coincides with the front 54 of the base 36. The vertical plane 90 is also orthogonal to the plane 9 of the base 36.

The cutting device 100 is arranged as follows. The grip bottom portion 3 rotatably attaches to/rotatably engages with the boss 34. For this purpose, the grip holding mechanism 5 (here, a threaded screw) passes through holes in both the boss 34 and the grip bottom portion 3. Only a knurled knob of the grip holding mechanism 5 is visible in the figure.

The grip holding mechanism 5, the boss 34 and the grip bottom portion 3 are aligned along a grip rotation axis 8. The grip rotation axis 8 is substantially parallel to the plane 9 of the base 36. The grip rotation axis 8 passes through the grip bottom portion 3 and the boss 34.

A reference plane 199 of the cutting device 100 is also shown. The reference plane 199 extends vertically upward from and is perpendicular to the top surface 11 of the sheet goods 10. The reference plane 199 is also coplanar with the guide axis 8.

More detail for the grip top portion 2 is as follows. The distal end 46 faces the sheet goods 10 and is located near the front 54 of the base 36. The grip top portion 2 holds a blade that extends outward from the distal end 46 towards the top surface 11 of the goods 10. The grip top portion 2 is typically sloped somewhat relative to the vertical plane 90 and is sloped upward from its distal end 46 to its proximal end 44. In more detail, the proximal end 44 extends somewhat away from the vertical plane 90 in the negative Y direction, while the distal end 46 either coincides with the vertical plane or extends slightly beyond the vertical plane 90 in the positive Y direction. Such an orientation of the grip 1 has been found to improve engagement of the knife blade with the sheet goods 10.

The cutting device 100 generally operates as follows. An individual inserts a knife such as a hobby knife (not shown), with its blade facing downward into the blade cavity 13 until the knife blade extends at a desired depth/a desired distance beyond the edge of the distal end 46 of the grip top portion 2. The individual then adjusts the blade holding mechanism 4 (here, a screw that threads into the grip top portion 2 and increasingly extends into the cavity when tightened) to secure the handle of the hobby knife within the grip 1. The individual can then place one of their hands around the base 36 and grip 1 to guide the cutting device 100 to make cuts in the sheet goods 10. These cuts can include straight and curved cuts.

The cuts can be made at a variety of angles or bevels with respect to the top surface 11 of the sheet goods 10/with respect to the reference plane 199. For this purpose, the individual rotates the grip 1 relative to the boss 34 along the grip rotation axis 8 until the blade is placed at the desired angle/bevel with respect to the top surface of the sheet goods 10/with respect to the reference plane 199.

The individual then tightens the grip holding mechanism 5 to secure the grip 1 relative to the base 36. In one example, the grip 1 is configured to rotate with respect to the boss 34 (and thus with respect to the base 36), along the grip rotation axis 8, such that the blade is held at angles in a range from about (−) 75 degrees to 0 degrees with respect to the top surface 11 of the goods 10/with respect to the reference plane 199. In another example, the grip 1 is configured to rotate with respect to the boss 34/base 36, along the grip rotation axis 8, such that the blade is held at angles in a range from 0 degrees to about (+) 75 degrees with respect to the top surface 11 of the sheet goods 10/with respect to the reference plane 199.

Figure 2:
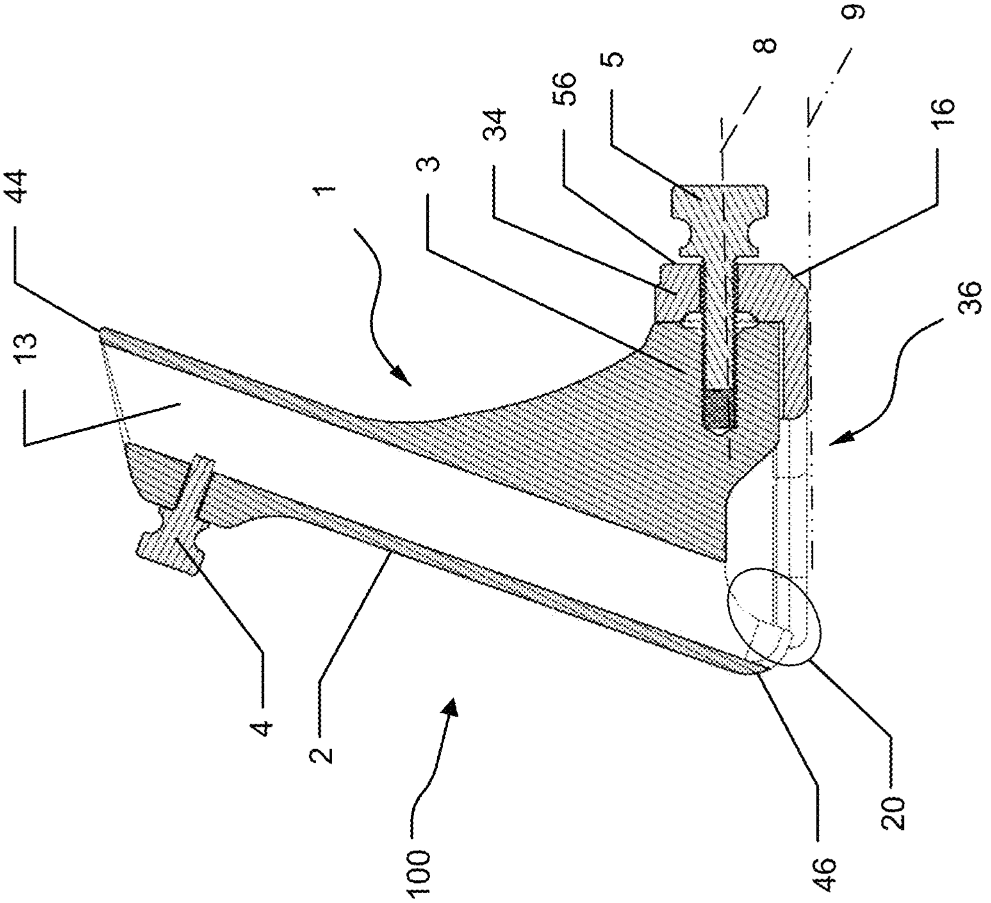
FIG. 2 is a cross sectional view of the cutting device in FIG. 1.

FIG. 2 shows a side cross-section of the cutting device 100 in FIG. 1. This view provides more detail for aspects of the grip 1 and the base 36 that could not be shown in FIG. 1.

At the grip top portion 2 of the grip 1, the cavity 13 is shown extending from the distal end 46 of the grip top portion 2 to its proximal end 44. The grip top portion 2 is open at its proximal end 44 to accept a knife within the cavity 13. The stop cup 20 is located at the distal end 46 of the grip top portion 2. The blade holding mechanism 4 (here, a thumbscrew) is also shown.

At the grip bottom portion 3 of the grip 1, the grip holding mechanism 5 (here, a thumbscrew) is shown entering a horizontal hole in the grip bottom portion 3. The hole has a threaded portion that is designed to engage the threads of the grip holding mechanism 5. At the base 36, the boss 34 also has a hole through which the grip holding mechanism 5 passes. The holes of the grip bottom portion 3 and the boss 34 are in alignment with one another and are collinear with the grip rotation axis 8.

A chamfer 16 that runs along a length of the base 36 at its back 56 is also shown. The chamfer enables attachment of accessories such as a guide tool to the base 36 and thus to the cutting device.

In the illustrated example, only an end portion of the thumbscrew/grip holding mechanism 5 is threaded to engage with the threads of the grip bottom portion 3. The unthreaded portion of the grip holding mechanism 5 functions as a smooth pivot point for enabling rotation of the grip 1 (via its grip bottom portion 3) relative to the base 36 (via its boss 34). Tightening of the thumbscrew/grip holding mechanism 5 secures the grip 1 to the base 36. In this way, the grip holding mechanism 5 enables the grip 1 to rotate relative to the base 36 when the grip holding mechanism 5 is not tightened, and also locks a position of the grip bottom portion 3 relative to the boss 34 for securing the grip 1 to the base 36 when the grip holding mechanism 5 is tightened.

Typically, the grip top portion 2 and the grip bottom portion 3 are formed from a unitary piece of material such as metal or plastic. In other examples, the grip top portion 2 and the grip bottom portion 3 are separate components and attach to one another via screws, clips, glue or via a compression fit.

In a similar vein, the base bottom portion 74 and the boss 34 of the base 36 are typically formed from a unitary piece of material such as metal or plastic. However, the bottom portion 74 and the boss 34 might also be separate components and attach to one another via screws, clips, glue or via a compression fit.

Figure 3:
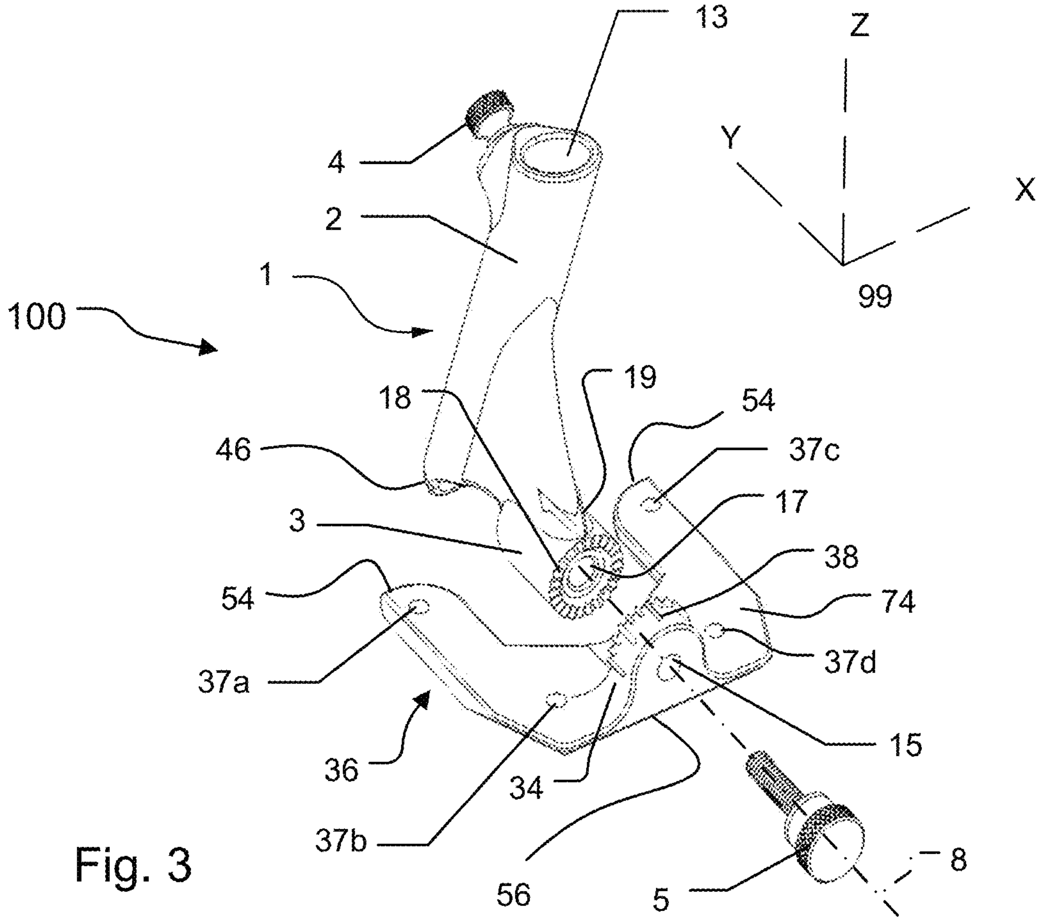
FIG. 3 is an isometric exploded view of the cutting device in FIG. 1.
Figure 4:
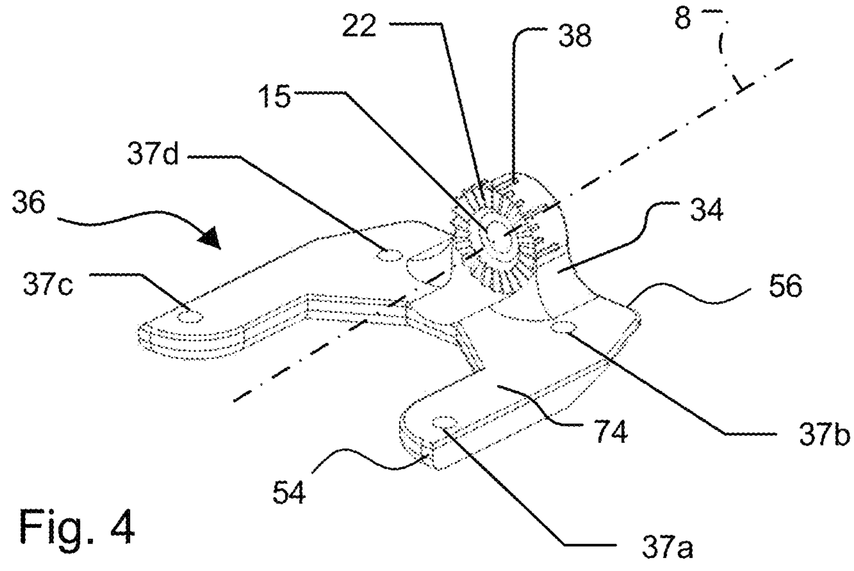
FIG. 4 is an isometric view of a base of the cutting device.

FIGS. 3 and 4 show more detail for how the grip 1 rotatably attaches to the base 36. These figures provide detail that could not be shown in the previous figures.

In FIG. 3, the grip bottom portion 3 includes a grip splined surface 18 that faces toward the back 56 of the base 36 (here, oriented towards the viewer in the negative Y direction of the coordinate system 99). An alignment feature 19 of the grip bottom portion 3 is also shown. A threaded hole 17 of the grip bottom portion 3 and a hole 15 of the boss 34 are aligned with one another and are collinear with the grip rotation axis 8. A threaded end of the grip holding mechanism 5 enters the hole 15 at the back 56 of the base 36, and enters the threaded hole 17 of the grip bottom portion 3 until the threaded end engages with the threaded hole 17. Angle indicator features 38 of the boss 34 are also shown.

In FIG. 4, the boss 34 includes a base splined surface 22 that faces towards the front 54 of the base 36. The angle indicator features 38 of the boss 34 are also shown.

Returning to FIG. 3, the grip splined surface 18 is configured to engage with the boss splined surface 22 to enable locking rotation of the grip 1 relative to the base 36, along the grip axis 8, in fixed degree increments. In one example, the fixed increments of locking rotation of the grip 1 relative to the base 36 are in fixed increments of fifteen (15) degrees. In another example, the fixed increments are as few as (5) degrees. In still another example, the fixed increments can be as few as two (2) degrees.

Operation of the cutting device 100 with the splined surfaces is generally as follows. The individual loosens the grip holding mechanism 5 to allow the grip 1 to move freely relative to the base 36, moves the grip 1 towards the base 36 such that the splined surfaces engage at a desired position, and then tightens the grip holding mechanism 5. During this process, the individual can compare the angle indicator features 38 of the boss 34 against the alignment feature 19 of the grip 1 to select a desired bevel.

It can also be appreciated that the cutting device 100 can be provided without the splined surfaces. In this way, the grip 1 is free to rotate relative to the base 36 until secured by the grip holding mechanism 5. However, the bevel angle provided is left to the individual to determine or otherwise measure. Moreover, such a capability could also be supported when the cutting device 100 includes the splined surfaces by placing a plastic spacer or washer between the grip splined surface 18 and the base splined surface 22.

Figure 5:
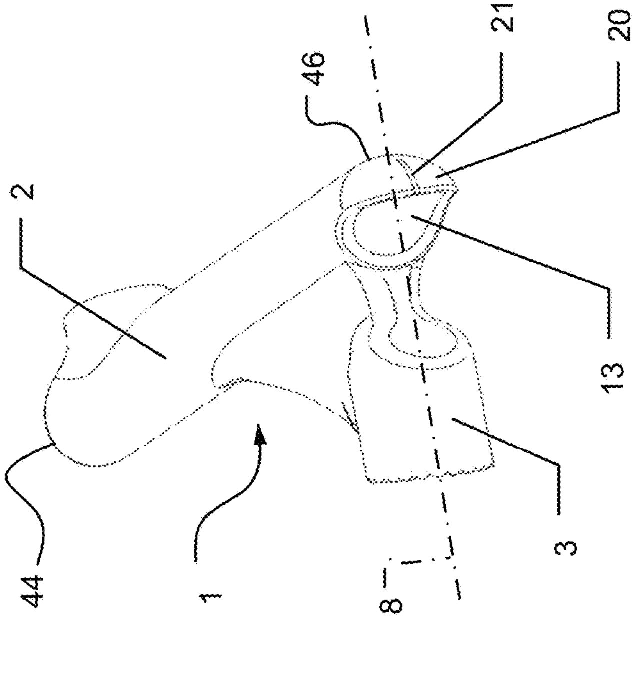
FIG. 5 is an underside isometric view of a grip of the cutting device in FIG. 10, showing details of a blade entry slot within the grip.

FIG. 5 shows more detail for the stop cup 20 at the distal end 46 of the grip top portion 2. In the illustrated example, the stop cup includes a slotted opening 21 through which the blade passes.

Figure 6:
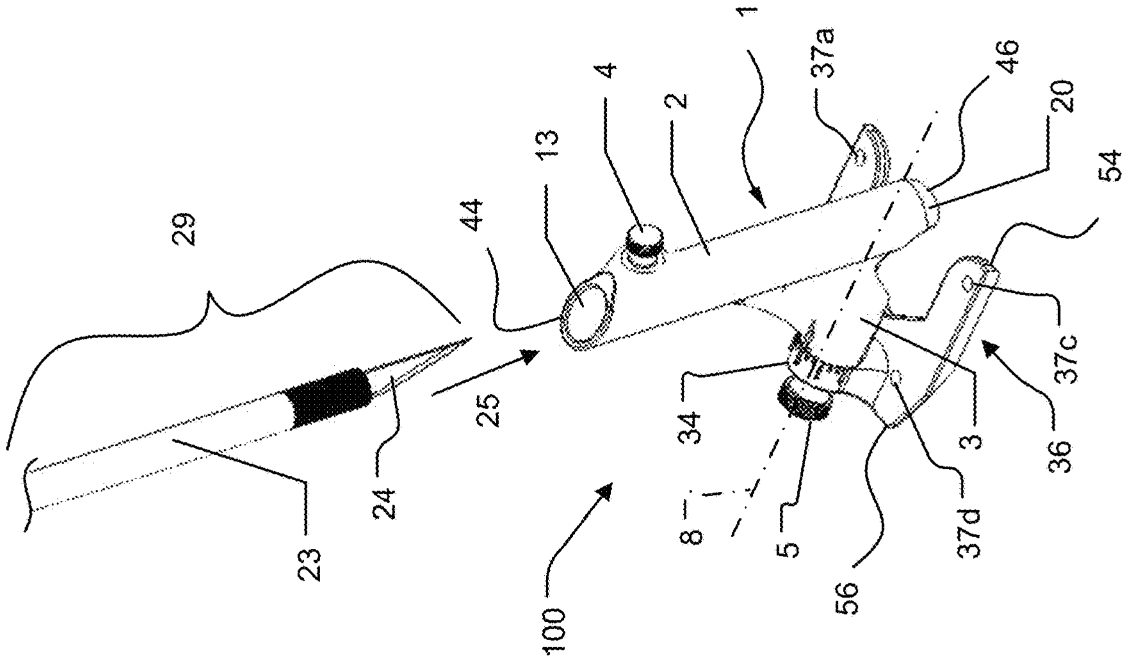
FIG. 6 is a diagram illustrating how an exemplary hobby knife handle and blade can be placed or otherwise inserted into the grip of FIG. 5.

FIG. 6 depicts a direction 25 in which a knife such as a hobby knife 29 is inserted into the cutting device 100. In the illustrated example, the hobby knife is an X-ACTO knife. X-ACTO is a registered trademark of Elmer's Products, Inc.

The hobby knife 29 has a handle 23 and a blade 24 attached to an end of the handle 23. The hobby knife 29 is inserted blade-first into the cavity 13 at its open end (at the proximate end 44 of the grip top portion 2). With reference to FIG. 5, the blade 24 is inserted so that it passes through the slot 21. The individual then adjusts the hobby knife 29 within the cavity 13 such that the blade 24 extends outward from the slot 21 at the designed depth relative to the goods 10. The individual then tightens the blade holding mechanism 4 to secure the handle 23 within the cavity for securing the blade 24 at the desired depth relative to the top surface 11 of the goods 10.

The stop cup 20, as its name suggests, stops the handle 23 of the knife 29 from exiting the distal end 46 of the grip top portion 2 before the individual can tighten the blade holding mechanism 4 to secure the handle 23 within the cavity 13. In this way, the stop cup 20 captures the handle 23 when the blade 24 passes through the slot 21 of the stop cup 20, before the blade 24 is allowed to extend too far beyond the distal end 46 of the grip top portion 2. Not only does the stop cup 20 act as a safety mechanism to protect the goods 10 from inadvertent cuts and the individual from possible harm, but the slot 21 also minimizes flexing of the blade 24 during cutting.

Figure 7:
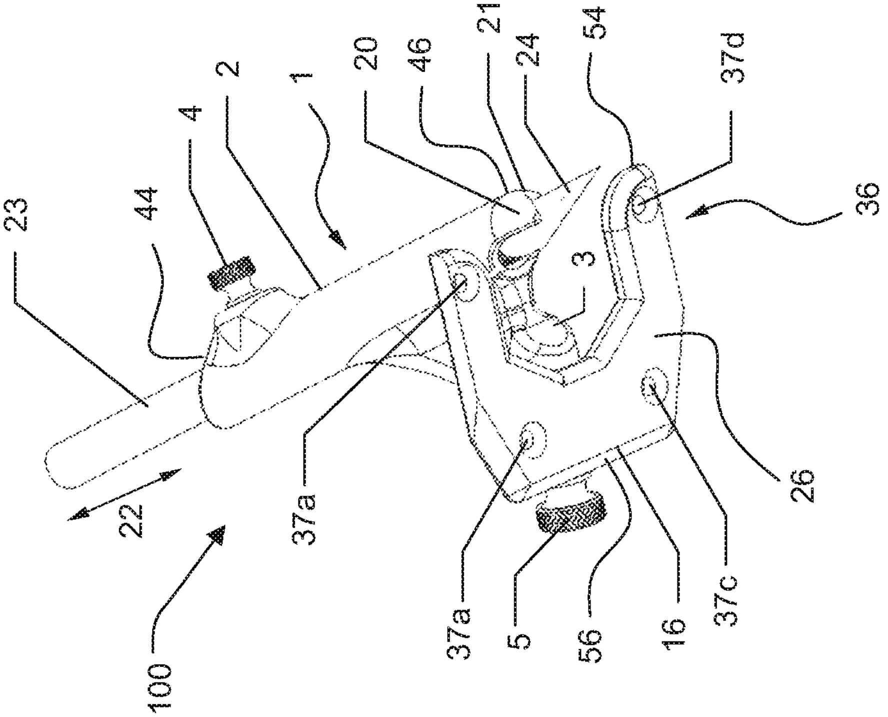
FIG. 7 is an underside isometric view of the cutting device of FIG. 1, showing a hobby knife and blade installed into the grip.

FIG. 7 is a view of the cutting device 100 that shows the bottom surface 26 of the base 36. The alignment features 37*a*. 37*b*, 37*c*, and 37*d* allow for compatibility with other accessories and embodiments. The figure also shows how the stop cup 20 prevents a knife such as the hobby knife 29 of FIG. 6 from exiting from the grip top portion 2 before the individual can secure its handle 23 via the blade holding mechanism 4. The stop cup 20 also prevents the blade 24 from extending too far into the sheet goods 10.

Figure 8:
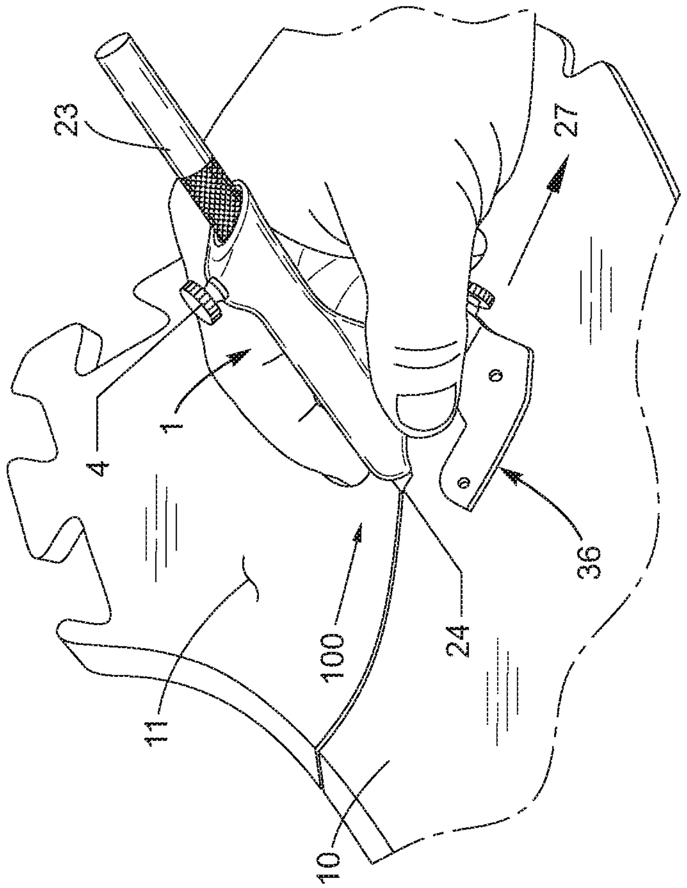
FIG. 8 is an image of a user performing a cut using the cutting device of FIG. 1.

FIG. 8 depicts an individual performing a cutting operation in an exemplary instance of sheet goods 10 with the cutting device 100. In the illustrated example, a hobby knife 29 is inserted into the cutting device 100 to cut curved, bevel cuts in a sheet of foam goods 10. The base 36 rests on the top surface 11 of the sheet goods 10 as the individual grips or otherwise holds the grip 1 with one hand. To perform the cutting operation, the individual typically draws/pulls the cutting device 100 towards the individual to direct the blade 24 through the goods, with the cutting device 100 defining the angle of cut relative to the top surface 11 of the goods 10/relative to the reference plane 199.

Figure 9:
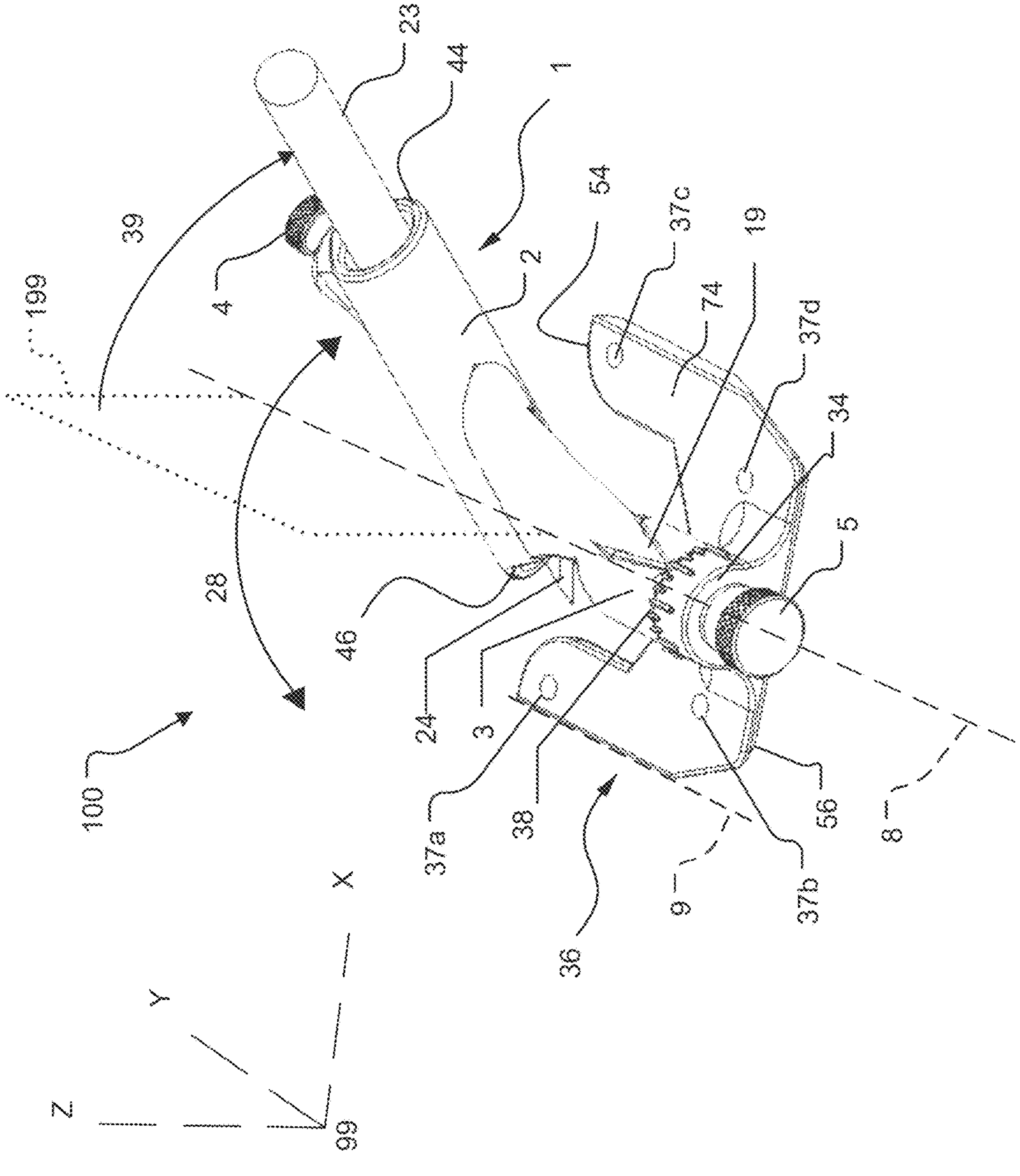
FIG. 9 is a rear isometric view of the cutting device of FIG. 1, where a hobby knife and blade installed the device are shown, and the cutting device is configured to provide a +45° bevel.

FIG. 9 shows the cutting device 100 set to cut a (+) 45 degree bevel cut, relative to the top surface 11 of the goods 10/relative to the reference plane 199. The individual configures the rotation 28 of the grip 1 in increments provided by the splined surfaces 18 and 22 and then tightens the grip holding mechanism 5 before cutting. In the illustrated example, the grip 1 is rotated to the right of the reference plane 199, such that the grip top portion 2 is at +45 degrees with respect to the top surface 11 of the goods 10/with respect to the reference plane 199. This is indicated by reference 39.

Due to practical considerations, the ranges of bevel cuts that the cutting device 100 can provide are generally between about (−75) degrees and 0 degrees when the grip 1 is rotated to the left of the reference plane 199, and between 0 degrees and about (+75) degrees when the grip 1 is rotated to the right of the reference plane 199.

Figure 10:
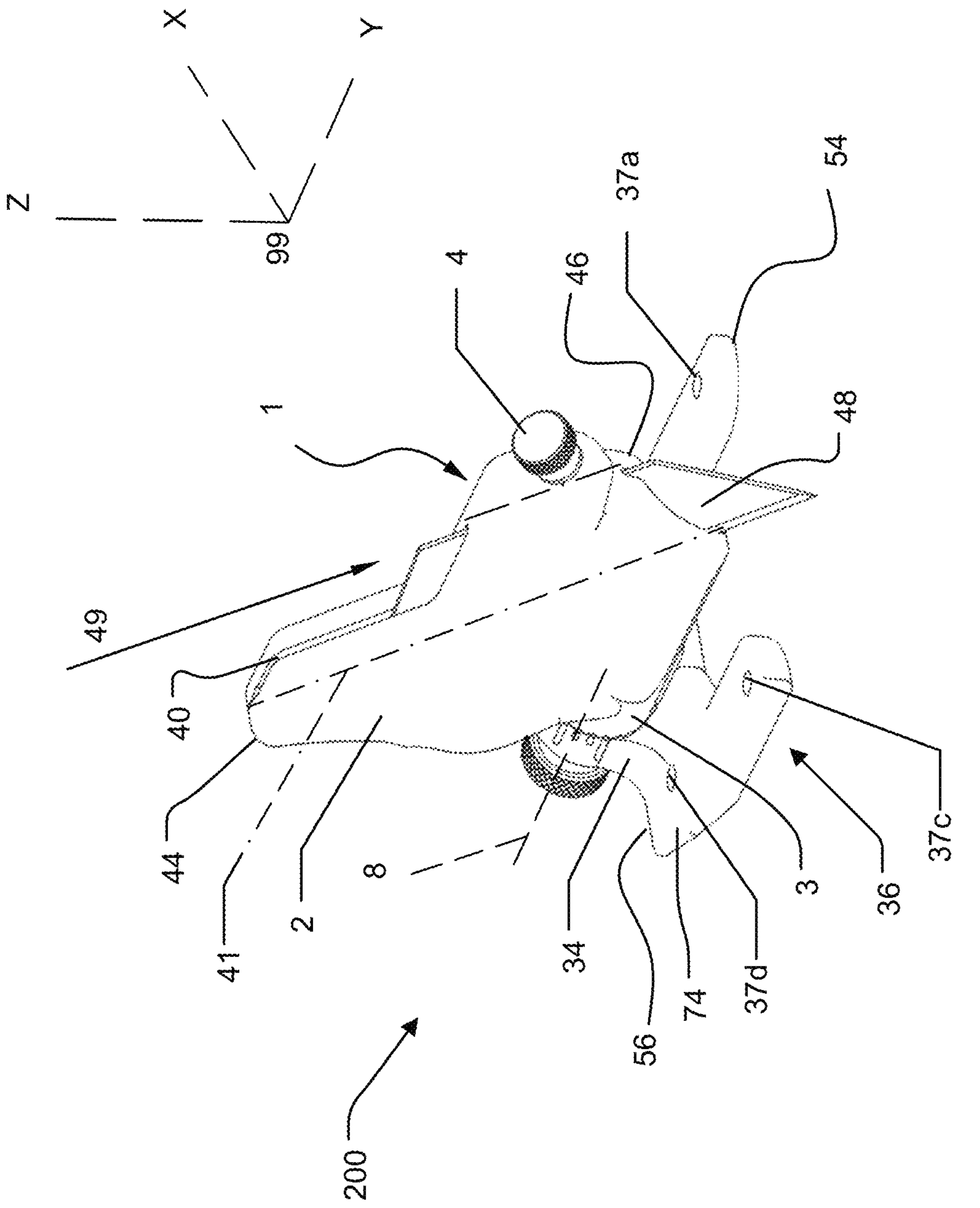
FIG. 10 is an isometric view of a cutting device, according to another embodiment, which is compatible with standard utility box-cutting blades or straight edge razor blades, in examples.

FIG. 10 depicts another cutting device 200, according to another embodiment. The cutting device 200 includes substantially the same components as and functions in a substantially similar fashion to the embodiment of the cutting device 100 shown in FIG. 1 through FIG. 9. However, there are differences. The grip 1 is compatible with standard trapezoid-shaped "box cutting" utility blades 48, as well as standard rectangular "single edge" razor blades. For this purpose, the grip top portion 2 is configured to include a slot 40 that extends from the proximal end 44 to the distal end 46. The slot 40 receives the blade 48 at the proximal end 44 and is inserted in a direction of insertion 49 as shown, and the slot 40 defines a movement path of the blade 48. Reference 41 indicates the path that the blade follows in the slot 40.

The blade holding mechanism 4 of the cutting device 200 also holds or otherwise secures the blade 48 differently than the mechanism 4 of the cutting device 100. Rather than hold or otherwise secure a handle of a knife, the blade holding mechanism 4 is configured to hold or otherwise secure the blade 48 itself within the slot 40/grip top portion 2. In the illustrated example, the blade holding mechanism 4 is located near a front of the grip top portion 2 and threads into a threaded hole in the front of the grip top portion 2. In one example, the blade holding mechanism 4 is a screw with a knurled knob (as shown) that applies force to a top surface of the blade 48 when tightened. In another example, the blade holding mechanism 4 is also a screw with a knurled knob at an end that faces the individual, but has a U-shaped or V-shaped piece of spring steel or plastic at its opposite end that is configured to engage the top of the blade. Typically, a stop cup is not utilized in the cutting device 200.

In yet another example, the blade holding mechanism 4 might be located near a side of the grip top portion 2 and is a threaded screw designed to engage a side of the blade 48. Via the blade holding mechanism 4, the individual adjustably secures the blade 48 within the slot 40 at a distance relative to the distal end 46 to adjustably secure the blade 48 at the desired depth relative to the top surface 11 of the sheet goods 10.

Figure 11:
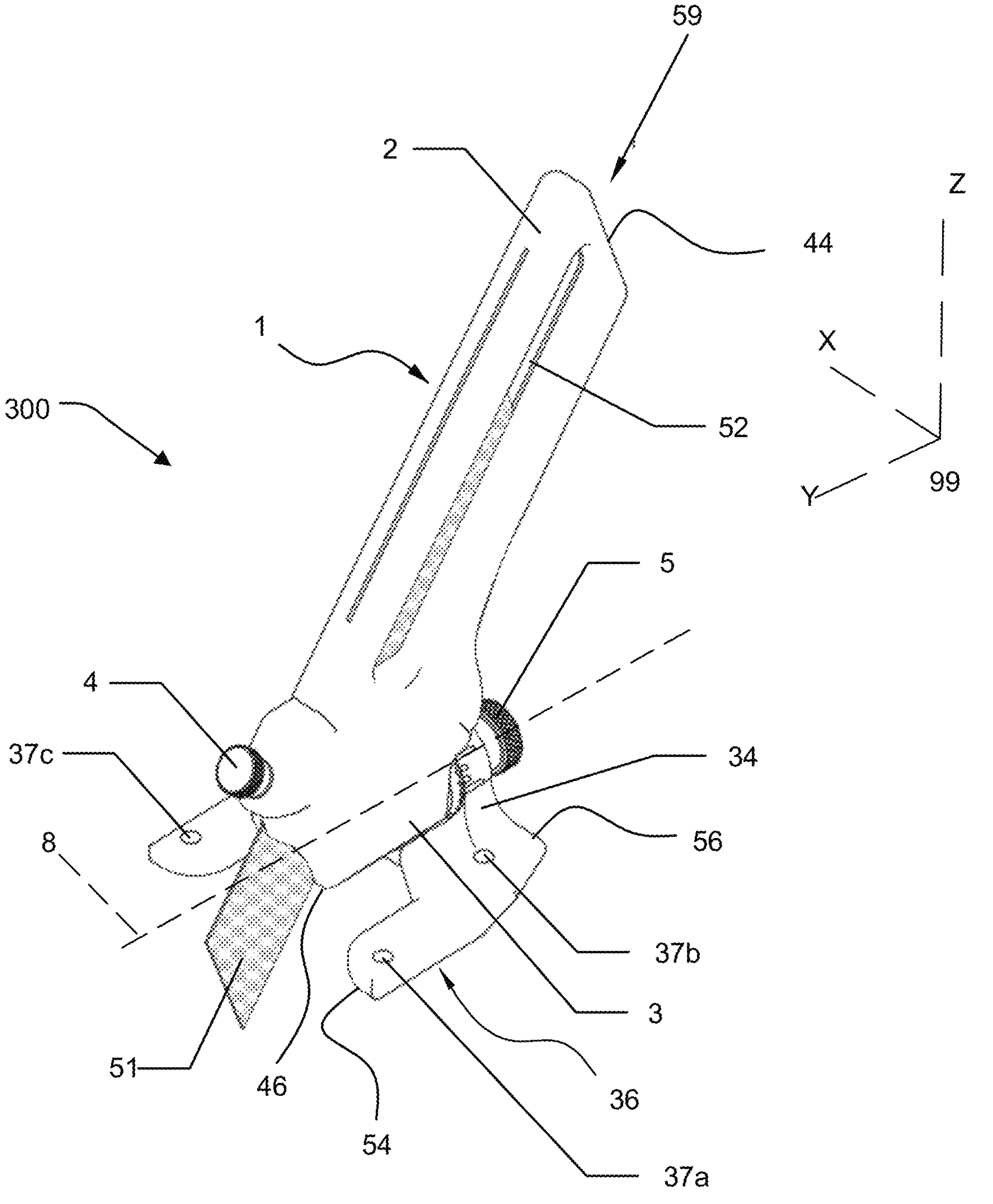
FIG. 11 is an isometric view of a cutting device, according to another embodiment, which is compatible with standard breakoff blades.

FIG. 11 depicts another cutting device 300, according to another embodiment. The cutting device includes substantially the same components as and functions in a substantially similar fashion to the cutting devices 100 and 200. However, there are differences. Like the cutting device 200 of FIG. 10, the grip top portion 2 of the cutting device 300 is configured to include a slot 52 that extends from the proximal end 44 to the distal end 46 of the grip top portion 2. Here, however, the grip top portion 2 is designed to hold a breakoff blade 51, such as standard 9 mm and 18 mm breakoff blades. The slot 52 receives the blade 51 at the proximal end 44 and is inserted in a direction of insertion 59 as shown, and the slot 52 defines a movement path of the blade 51. The blade holding mechanism 4 operates in a substantially similar way as and can be configured in ways similar to that described with the cutting device 200. Typically, a stop cup is not utilized in the cutting device 300.

Figure 12:
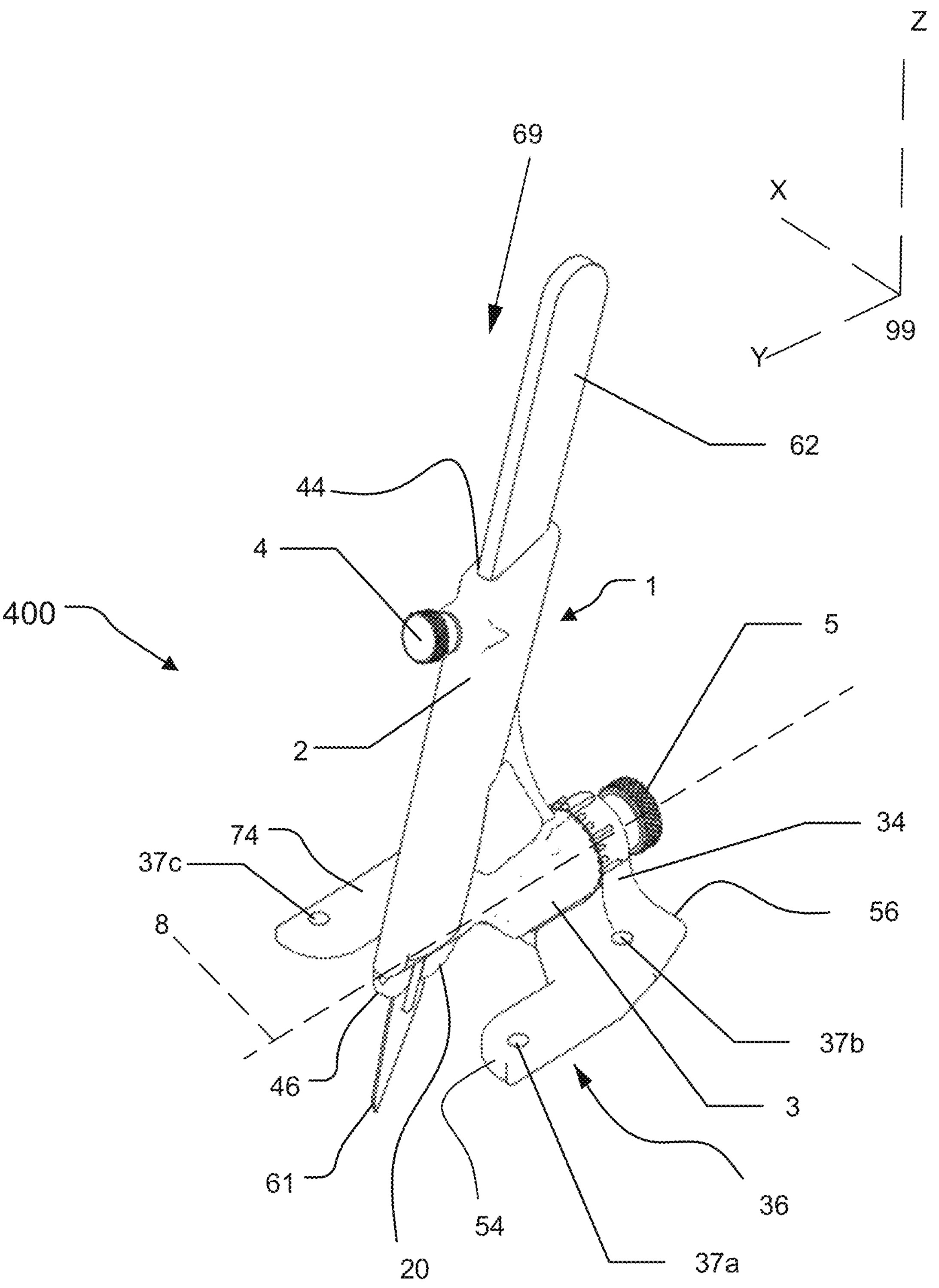
FIG. 12 is an isometric view of a cutting device, according to yet another embodiment, which is compatible with standard flat scalpel handles and blades.

FIG. 12 depicts yet another cutting device 400, according to another embodiment. The cutting device 400 includes substantially the same components as and functions in a substantially similar fashion to the cutting devices 100, 200 and 300. However, there are differences. Here, the grip top portion 2 is configured to accept a standard surgeon's scalpel with handle 62 and surgical blade 61 attached to the handle 62.

The grip top portion 2 has a cavity (not shown) that extends from the proximal end 44 to the distal end 46 and has an opening at its proximal end 44 as in the cutting device 100. The scalpel is loaded into the proximal end 44 in the direction of insertion 69 as shown. However, the cavity is substantially rectangular in shape to confirm with the smaller, thinner rectangular handle 62 of most scalpels. The stop cup 20 is also included to contain or otherwise capture the scalpel/stop the handle 62 from exiting the distal end 46 of the grip top portion 2 as a safety mechanism.

Figure 13A:
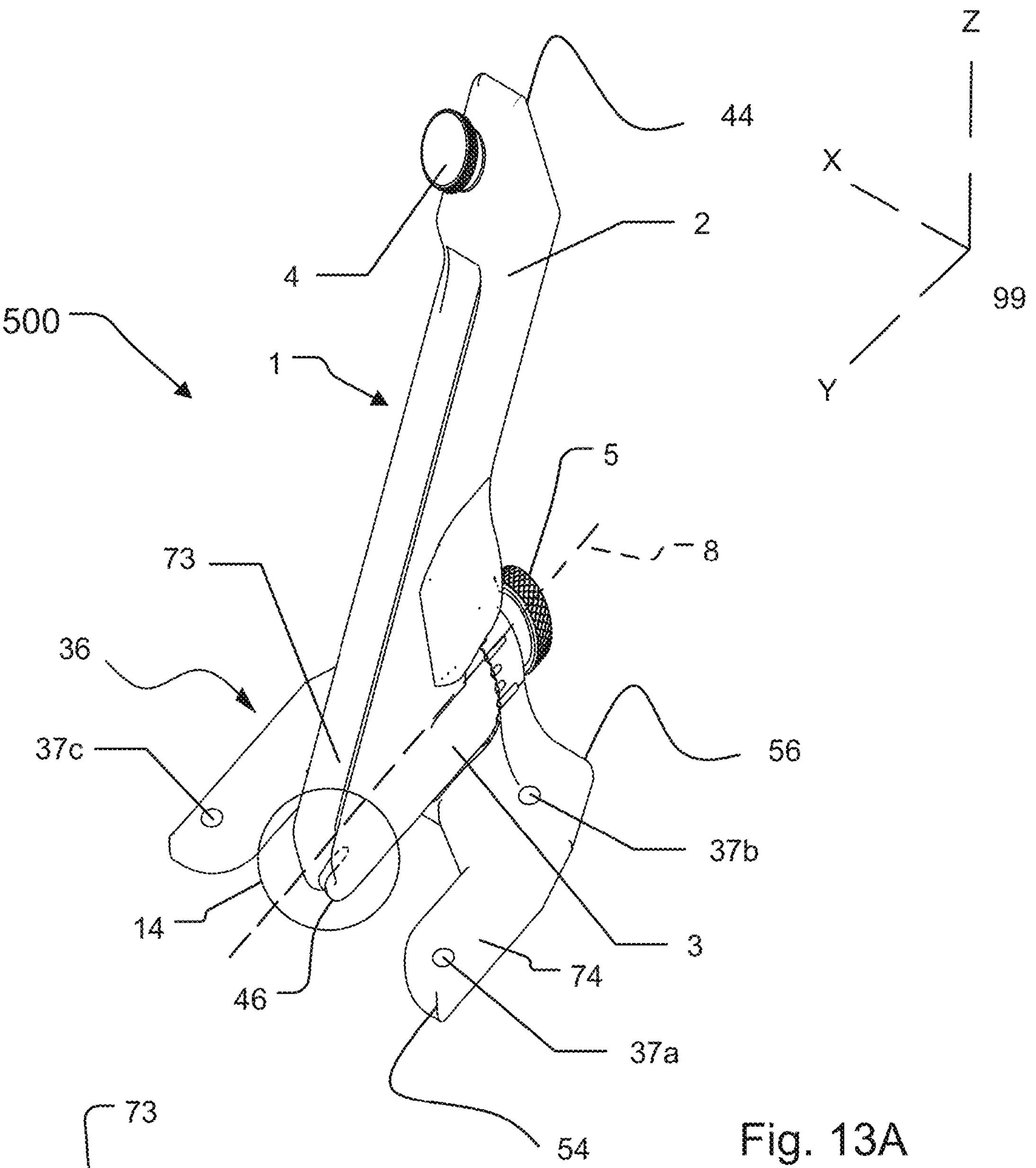
FIG. 13A is an isometric view of a cutting device, according to still another embodiment, where the cutting device has a blade handle channel formed in the grip that accepts knives with retractable blades.

FIG. 13A depicts still another embodiment of a cutting device 500. The cutting device 500 includes substantially the same components as and functions in a substantially similar fashion to the cutting devices 100, 200, 300 and 400. In contrast, the grip top portion 2 of the cutting device 500 is instead compatible with a variety of knives with retractable blades.

In the illustrated example, the grip top portion 2 has a U-shaped blade handle channel 73 that is designed to accept knives with retractable blades. These knives can include breakoff retractable blades and retractable utility blades, in examples. Here, the U-shaped blade handle channel 73 is open at the front of the grip top portion 2 to facilitate insertion of the handles of the knives within the grip 1. In examples, the handles of the knives are either loaded into the channel 73 at its open front or are loaded into the blade handle channel 73 from the proximate end 44 of the grip top portion 2. Reference 14 points to a front portion of the grip 1 near its distal end 46 that is magnified in FIG. 13B, the description of which follows below.

Figure 13B:
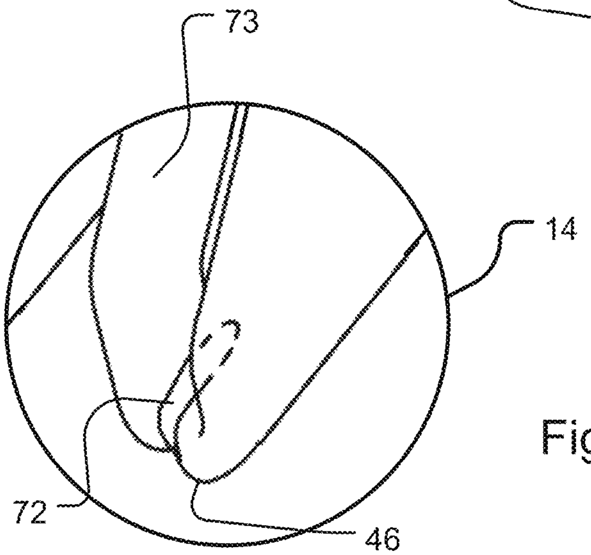
FIG. 13B is a magnified view of a distal end of the grip in FIG. 13A, where the view shows more detail for a blade slot in the grip through which the retractable blade extends when the knife is seated in the blade handle channel.

FIG. 13B is a magnified view of the cutting device 500 in FIG. 13A, for the area indicated by reference 14 in FIG. 13A. The view shows more detail for a blade slot 72 in the grip 1 at its distal end 46. The blade slot 72 receives the retractable blade when the knife is seated in the blade handle channel 73. The retractable blade extends through the blade slot 72 towards the top surface of the sheet goods 10.

The blade slot 72 has the following properties. It provides support for the blade and also ensures that the blade is centered within the distal end 46 of the grip 1. In this way, the cutting device 500 can accept knives with retractable blades that are offset with respect to the handles of the knives/with respect to a center axis that runs along a length of the handles, without requiring the individual to adjust the cutting device 500 prior to cutting to account for the blade offset.

Figure 14:
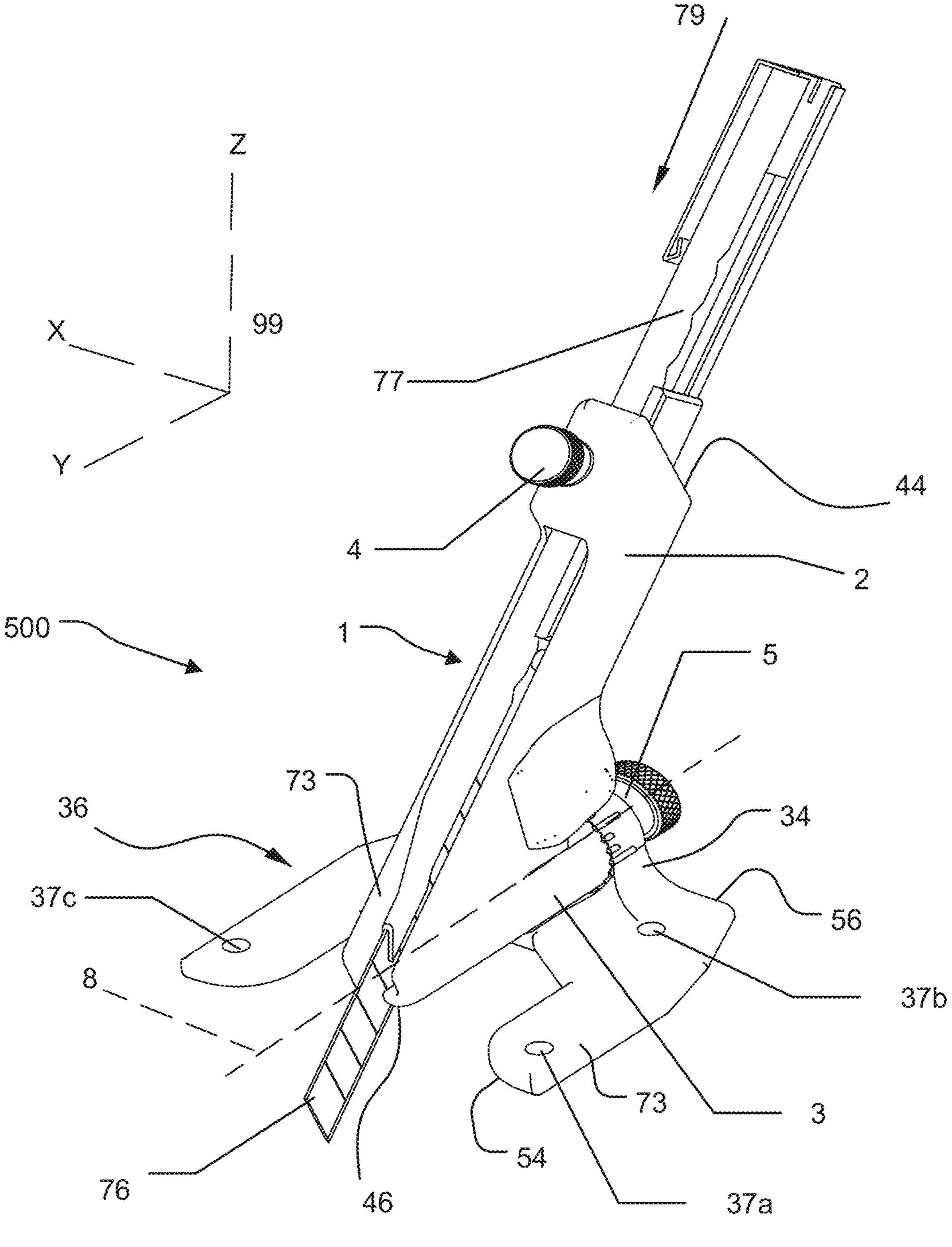
FIG. 14 is an isometric view of the cutting device in FIG. 13A, where the figure illustrates a direction at which an exemplary "breakoff" combination retractable blade and handle knife can be placed into the cutting device.

FIG. 14 depicts the cutting device 500 of FIG. 13A holding an exemplary retractable knife. The knife has a retractable 9 mm "breakoff" blade 76 that extends through the blade slot 72 (not visible) and its handle 77 is seated within the blade handle channel 73. The retractable knife is installed from a direction of insertion 79 as shown in the figure. The handle 77 is secured via the blade holding mechanism 4. Here, the blade holding mechanism 4 operates in a similar fashion as in the cutting device 100 and 400; namely, the blade 76 is held by its handle 77, and the blade holding mechanism 4 holds the handle 77 securely in the blade handle channel 73. This is functionally equivalent to the blade holding mechanism 4 holding the blade 76 securely in the grip 1 of the cutting device 500.

Unlike the cutting devices 100 and 400, the illustrated cutting device 500 requires that the individual perform an additional step for adjusting the desired depth of the blade

76. Via the retraction mechanism of the knife, the individual first advances the blade 76 outward beyond the end of the knife. The individual then places the knife in the blade handle channel 73 such that the blade 76 extends through the blade slot, and the handle 77 seats in the blade handle channel 73 of the grip. The individual may have to repeat this process a few times in order for the blade 76 to extend an amount beyond the distal end 46 of the grip top portion 2 so that the blade 76 is at the desired depth with respect to the goods 10. The individual then tightens the blade holding mechanism 4 to secure the knife within the grip 1, the result of which secures the blade 76 at a desired depth relative to the top surface 11 of the sheet goods 10.

Figure 15:
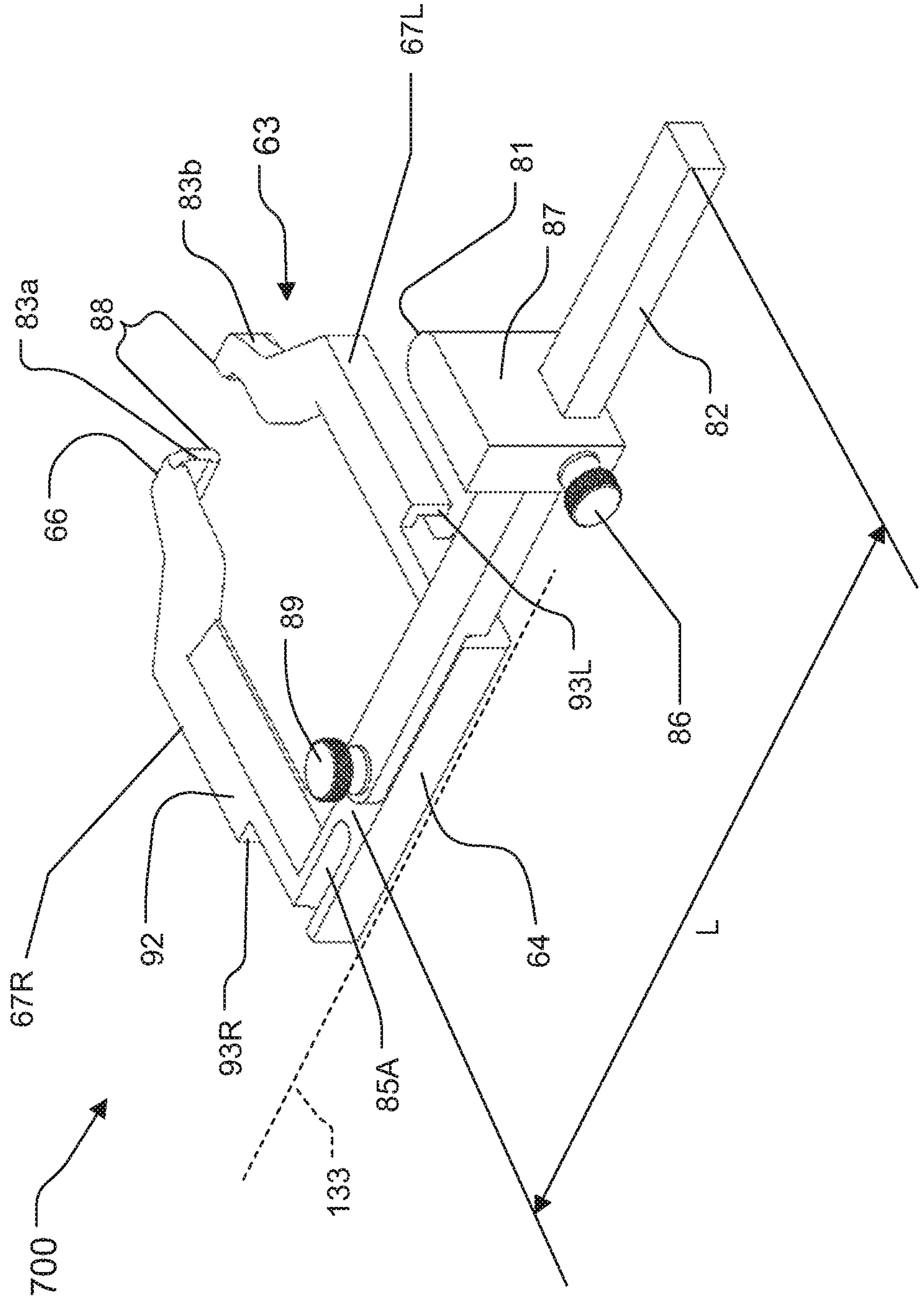
FIG. 15 is an isometric view of a proposed guide tool, where the guide tool is designed for attachment to and is compatible with all embodiments of the cutting device.

FIG. 15 depicts a guide tool 700 that is compatible with all embodiments of the cutting device 100, 200, 300, 400, 500. The guide tool 700 attaches to the base 36 of the cutting device via the holes 37*a-d* of the base 36. When used in combination with any of the previous embodiments of the cutting device, the guide tool 700 allows for individuals to cut straight or curved lines in sheet goods 10 by using a variety of different reference planes or axes as guides during cutting.

The guide tool 700 includes a C-shaped flange 63 configured to attach to the base 36 of the cutting device and a beam 82 that is removably attached to the flange 63. The flange 63 includes a number of surfaces and components that can be used as reference planes or reference axes during the cutting of goods 10. The flange 63 is designed to be placed upon the base 36 during attachment to the base 36 and thus lay in the plane 9 of the base 36 when attached.

The flange 63 has a front side 64 and back side 66 that opposes the front side 64, with an opening 88 at the back side 66 that gives the flange 63 its "C"-shape. Clip features 83*a* and 83*b* located at the back side 66 are also shown. The flange 63 also has a top surface 92 and includes slots within its top surface 92 near the front 64. Slot 85A is visible in the figure. The flange also includes a left overhang feature 93L located on a left side 67L of the flange 63 and a right overhang feature 93R located on a right side 67R of the flange 63.

Also shown is a flange front plane 133. The flange front plane 133 runs parallel to the front side 64 of the flange 63, along the length of its front side 64.

The beam 82 has an elongated, rectangular shape and attaches to the top surface 92 of the flange 63 near its front 64 via a beam fastening knob 89. The beam fastening knob 89 engages with a threaded hole on the top surface 92 of the flange (not shown). When the beam 82 is attached to the flange 63, the beam 82 extends outward from the flange 63 such that the length L of the beam 82 lay parallel to the flange front plane 133.

The beam 82 includes a guide block 87 that is removably attached to the beam 82 and is designed to slide along a length L of the beam 82. For this purpose, the block 87 has a rectangular-shaped opening through which the beam 82 passes to allow the block 87 to slide/move with respect to the beam 82. The guide block 87 is oriented substantially perpendicular to the beam 82 along the length L of the block 87 and secures to the beam 82 via a block fastening knob 86. The block 87 also has a rounded face feature 81.

Figure 16:
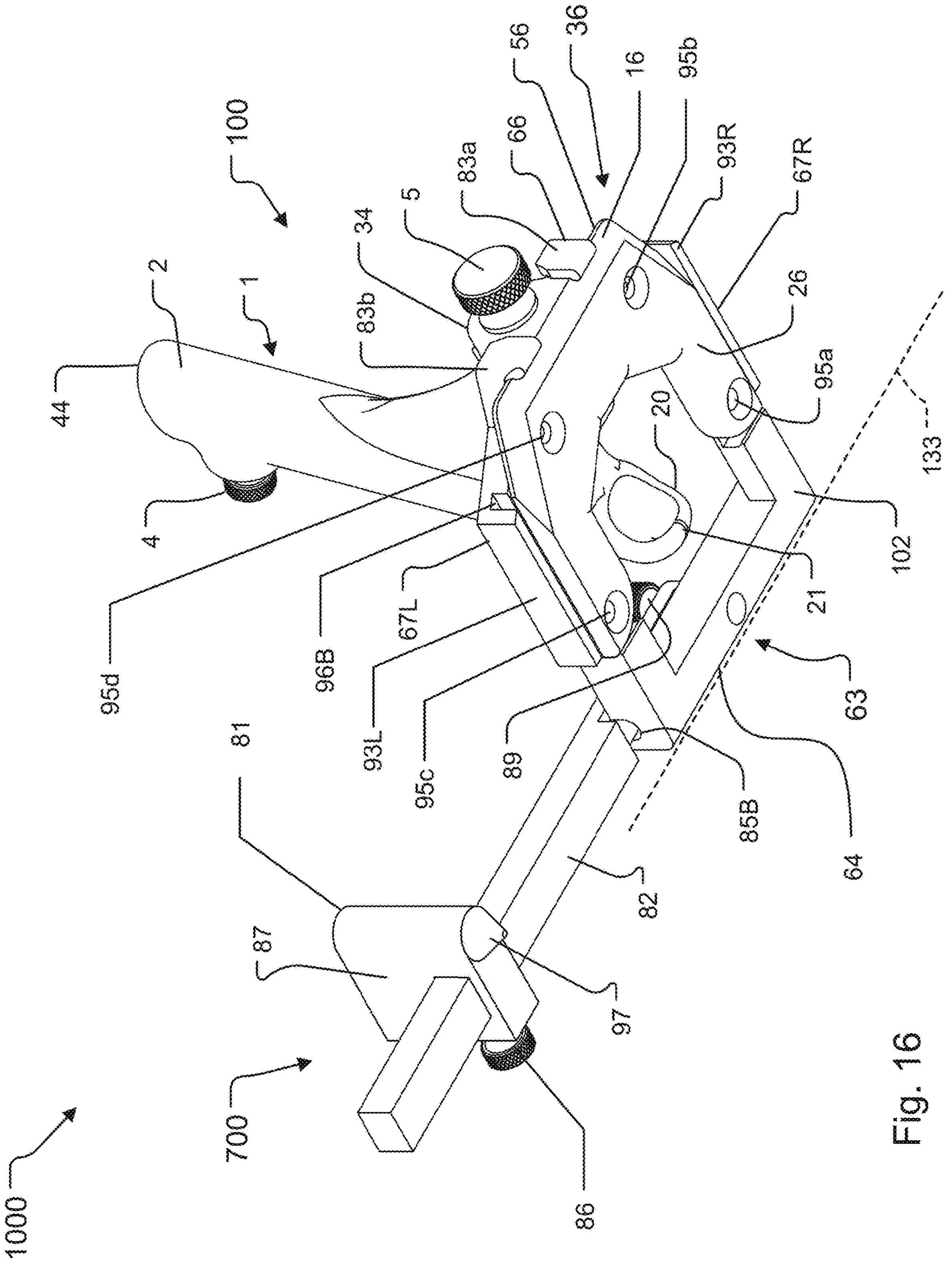
FIG. 16 is an underside isometric view of a cutting system, according to an embodiment, where the cutting system is formed when the guide tool in FIG. 15 is attached to the cutting device of FIG. 1, and where the figure illustrates mating features of the guide tool and the base of the cutting device to effect the attachment of the guide tool to the cutting device.

FIG. 16 shows how the guide tool 700 attaches to the base 36 of an exemplary cutting device 100 to form a cutting system 1000. In the illustrated example, the cutting system 1000 is viewed at an angle upward from the bottom surface 26 of the base 36. The figure also shows aspects of the guide tool 700 that were not visible in FIG. 15.

The base 36 of the cutting device 100 attaches to the flange 63 such that the back 56 of the base 36 is located at the back side 66 of the flange 63. The flange 63 is placed over the base 36 during attachment such that the top surface 92 of the flange 63 is visible. The opening 88 in the flange 63 provides the individual with easier access to, and improved adjustment of, the grip holding mechanism 5. The left overhang 93L and the right overhang 93R each provides a rail-like surface that is parallel to the reference plane 199 of the cutting device 100. An underside 102 of the flange 63 and a channel 96B formed within the overhang 93L are also shown.

The clip features 83*a* and 83*b* provide removable attachment of the flange 63 to the chamfer feature 16 of the base 36. During attachment, alignment features 95*a*, 95*b*, 95*c*, and 95*d* of the flange 63 respectively align with the holes 37*a*, 37*b*, 37*c*, and 37*d* of the base 36. When the flange 63 is attached to the base 36, the underside surface 102 of the flange 63 is coplanar with the bottom surface 26 of the base 36. A pivot 97 at the underside of the block 87 is also shown.

The beam 82 is attached to the flange 63. For this purpose, a tab of the beam 82 (not shown) seats within a slot 85B of the flange 63. The individual then tightens the beam fastener 89 to secure the beam 82 to the flange 63.

Figure 17:
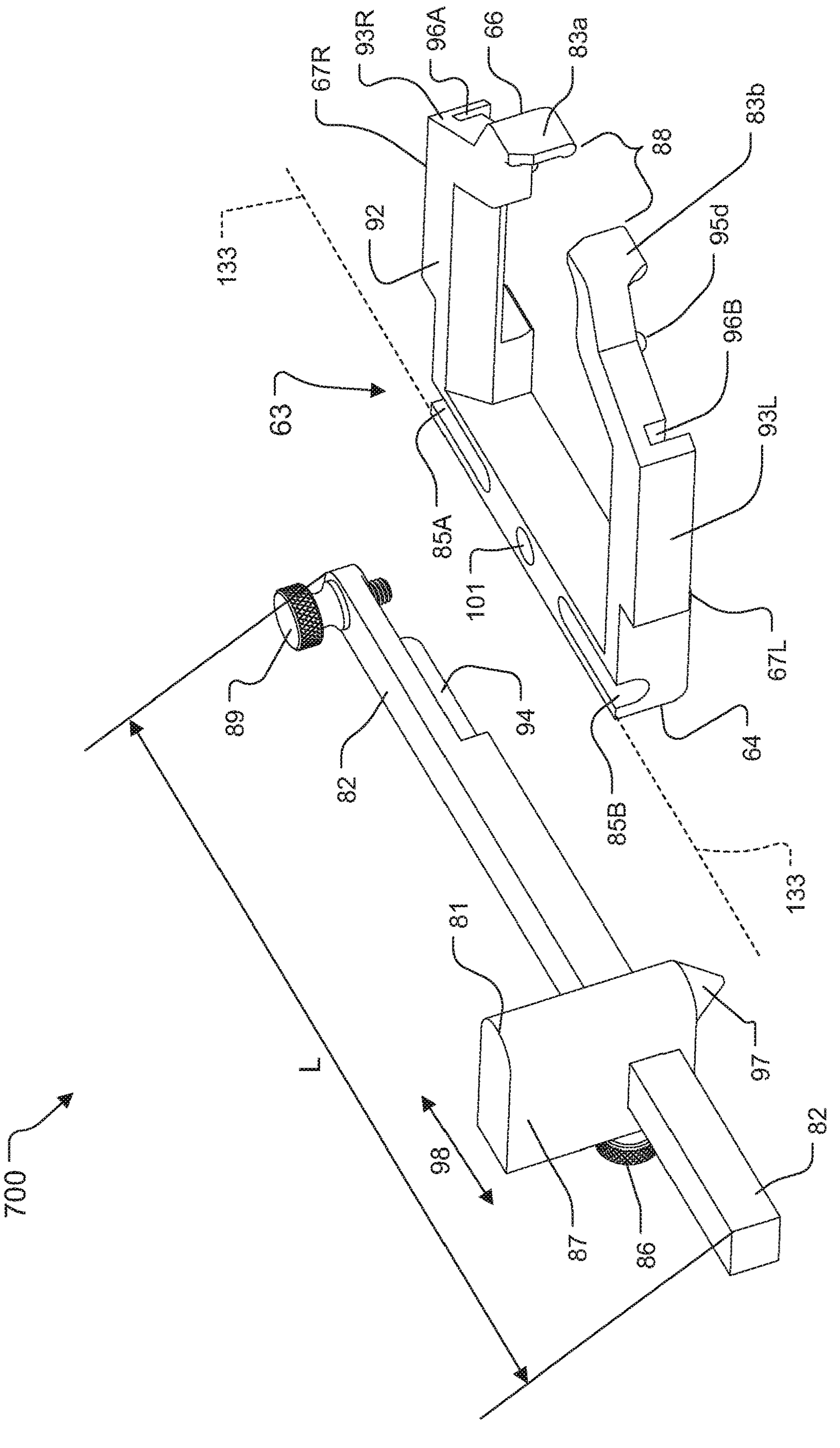
FIG. 17 is an exploded isometric view of the guide tool, where the figure illustrates various mechanical features of the guide tool that are not visible in the other views shown thus far.

FIG. 17 depicts an exploded view of the guide tool 700 that shows aspects of the tool that were not visible in prior figures. Reference 98 indicates a direction of movement of the block 87 along the length L of the beam 82. Threaded hole 101 at the top surface 92 of the flange 63 is shown.

A tab 94 at the underside of the beam 82 is also shown. The tab 94 is located near the end of the beam 82 where the beam fastener 89 is located.

More detail for attachment of the beam 82 to the flange 63 is as follows. The individual places the beam 82 onto the top surface 92 of the C-shaped flange 63 such that the tab 94 aligns with and seats within either slot 85A or slot 85B of the flange 63. This allows the beam 82 to be placed perpendicular to the reference plane 199 of the cutting device on either the left or right side of the flange 63. When the beam 82 is fastened to the flange 63, the length of the beam L is also parallel to the flange front plane 133.

The seating of the tab 94 within the slot 85A or 85B also prevents movement of the beam 82 relative to the flange 63, both prior to and after the fastener knob 89 is tightened to secure the beam 82 to the flange 63.

The left overhang 93L runs parallel to the left side 67L of the flange 63 and defines a channel 96B at the underside 102 of the flange 63 on its left side 67L. In a similar vein, a right overhang 93R runs parallel to the right side 67R of the flange 63 and defines a channel 96A at the underside 102 of the flange 63 on its right side 67R. The overhang 93L/channel 96B and the overhang 93R/channel 96A are designed to interface with an opposing channel or recess of a standard mat board cutting guide rail (not shown).

Figure 18:
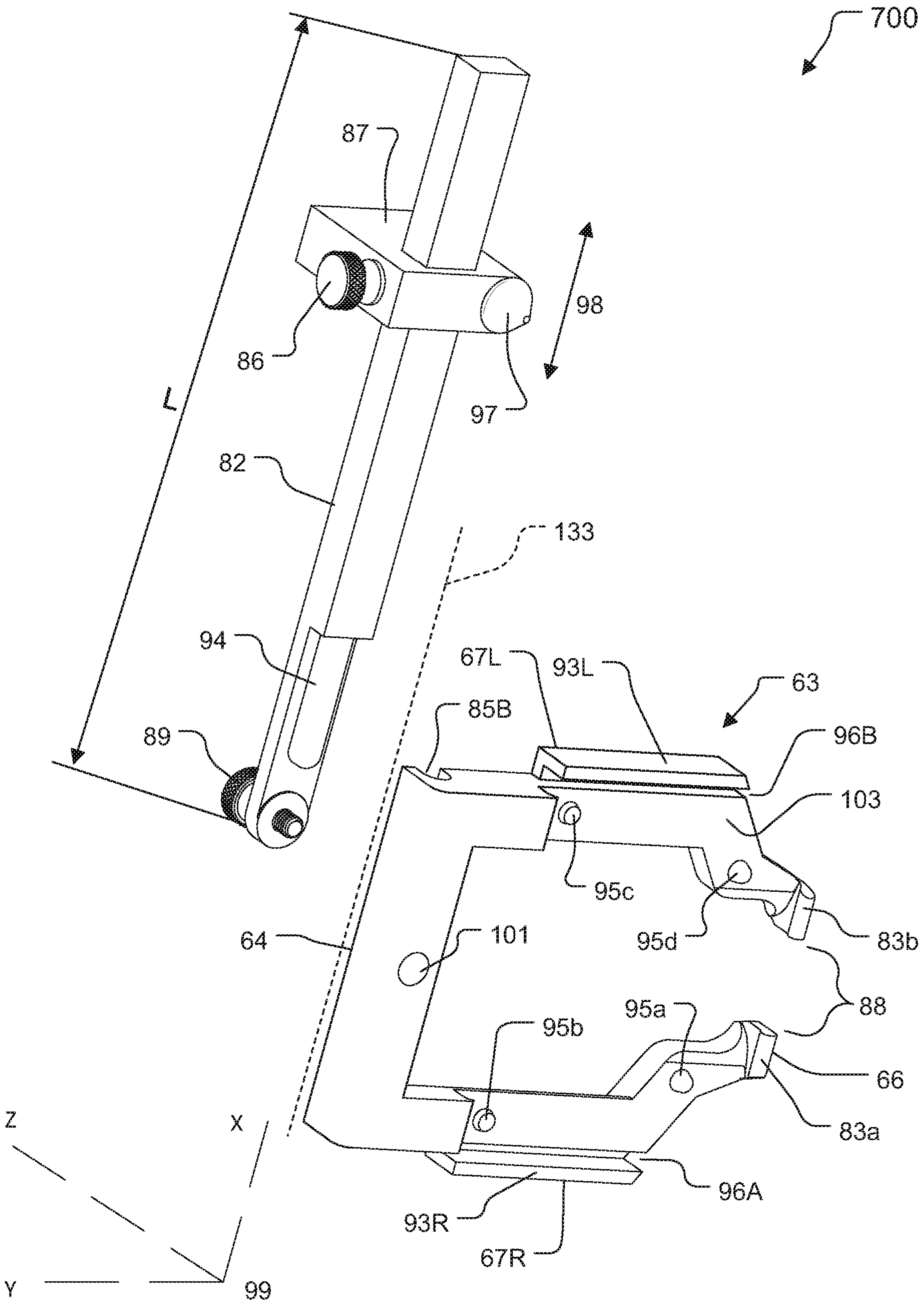
FIG. 18 is a partially exploded isometric view of the guide tool, where the figure illustrates additional mechanical features.

FIG. 18 is yet another exploded view of the guide tool 700. Here, the underside 102 of the flange 63 faces the viewer and the right side 67R of the flange 63 is oriented at the top of the figure. A recessed portion 103 of the flange 63 in which the bottom portion 74 of the base 36 seats is shown.

Figure 19:
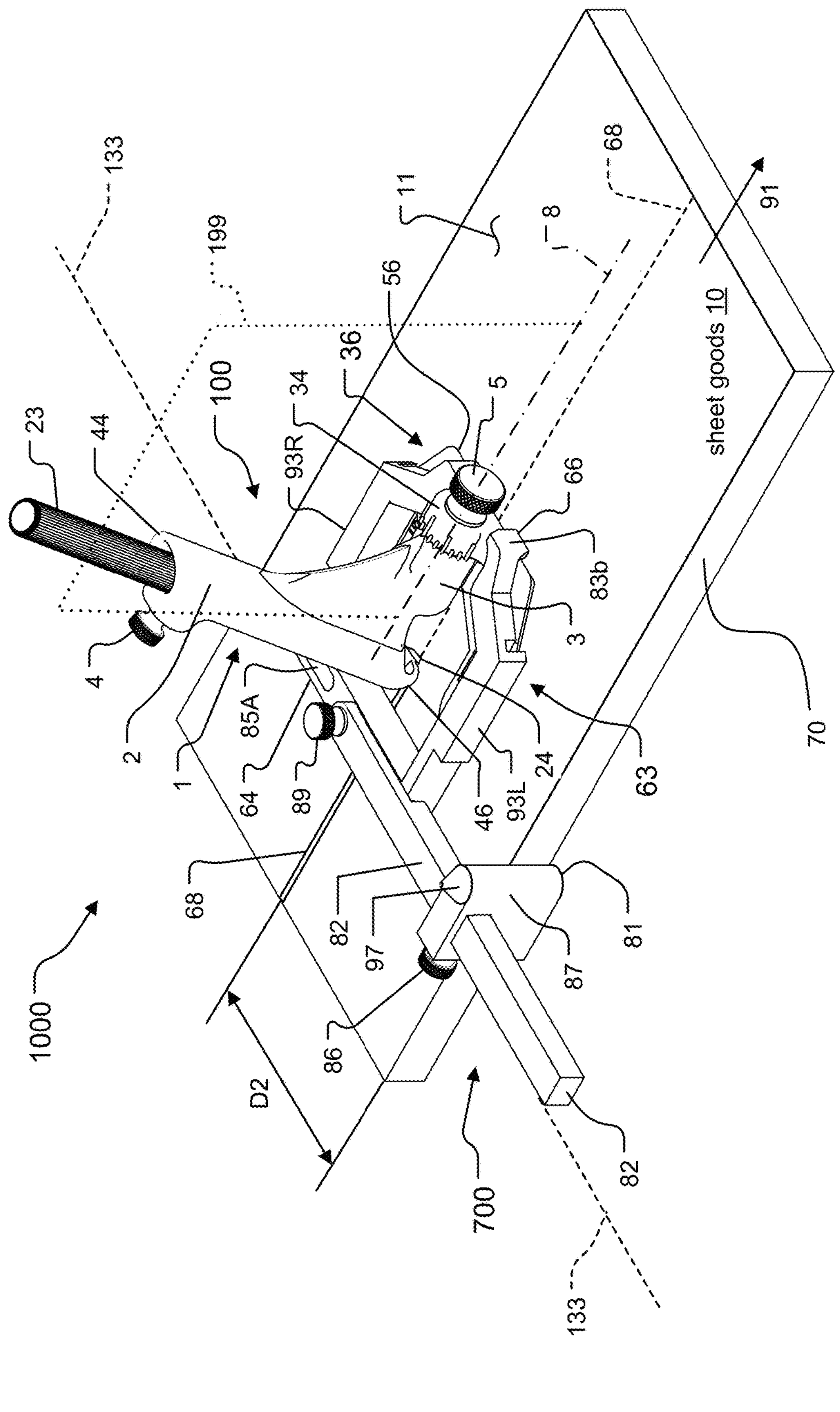
FIG. 19 is an isometric view of the cutting system in FIG. 16 that is placed on top of an instance of sheet goods, where the figure illustrates how the guide tool of the cutting system can be configured as an edge offset guide to provide guided straight cuts in the sheet goods when the sheet goods are of a sufficient thickness and have straight edges that run parallel to the desired cuts.

FIG. 19 depicts how an individual might utilize the cutting system 1000 of FIG. 16 to make a guided straight cut in an instance of sheet goods 10. Here, the sheet goods 10 is made from a material such as mat board, foam or cardboard with a thickness of typically 0.125" or greater, with substantially straight edges 70 that run parallel to the desired cuts. The straight edges 70 of the sheet goods can be used as references/offsets during the cuts.

In the illustrated example, a cut line 68 of a desired cut runs parallel to edge 70 of the goods 10. The cut line 68 is offset from the edge 70 at a distance D2 from the edge 70. The edge 70 is shown to the left of the figure. The cutting device 100 of the cutting system 1000 is currently configured to make a straight, 0 (zero) degree bevel in the sheet goods 10.

The individual configures the cutting device 100 and guide tool 700 of the cutting system 1000 to make a guided straight cut along the cut line 68 as follows. The individual first attaches the cutting device 100 to the flange 63 and places the left side of the flange 63 near the edge 70 of the sheet goods 10. The individual then places the cutting device 100 such that its blade 24 is aligned with the cut line 68. The individual then attaches the beam 82 to the flange 63 such that the tab 94 of the beam 82 is aligned with and seats within the channel 85B of the flange 63. The individual then tightens the beam fastener knob 89 to secure the beam 82 against the flange 63.

The individual then loosens the block fastening knob 86 and slides the block 87 until a side of the block 87 is disposed against the edge 70 of the goods 10. The individual then checks the location of the blade 24 relative to the cut line 68, and optionally moves the block 87 to finely adjust the position of the blade relative to the cut line 68. When the individual is satisfied that the blade 24 is in the proper location, the individual tightens the block fastening knob 86.

The components of the cutting system 1000 are arranged such that the system 1000 can make guided straight cuts in the sheet goods 10. As previously described, the front 54 of the base 36 aligns with the front 64 of the flange 63, and the flange front plane 133 runs parallel to the front side 64 of the flange 63 along the length of the front side 64. The length L of the beam 82 lay parallel to the flange front plane 133. The flange front plane 133 also lies perpendicular to the reference plane 199 of the cutting device.

Thus, when the guide tool 700 is attached to the cutting device 100, the beam 82 is arranged with respect to the cutting device 100 as follows: the beam 82 extends outward from the base 36/flange 63; the length L of the beam 82 runs parallel to the flange front plane 133; and, the length L of the beam 82 also lay perpendicular to the reference plane 199. The block 87 is also parallel to the cut line 68, the edge 70 of the sheet goods 10 and the reference plane 199.

As a result, when the individual arranges the guide tool 700 and cutting device 100 of the cutting system 1000 as illustrated and moves the cutting system 1000 in the cutting direction 91, the cutting system 1000 makes guided straight cuts in the sheet goods 10.

At this point, the individual can optionally adjust the depth of the blade and configure the cutting device 100 to provide a non-zero bevel, as previously disclosed in the description of FIG. 1 through FIG. 14 hereinabove.

The individual then prepares to make the cut by standing near the bottom of the figure, and placing the cutting system 1000 at the edge of the sheet goods 10 near the top of the figure with the back 56 of the base 36 facing the individual. The individual then typically places one of their hands around the grip 1, and pulls the cutting system 1000 as a unit towards the individual/towards the bottom of the figure in a cut direction 91 to effect the cut in the sheet goods 10.

Also in the figure, the block 87 is oriented such that its curved surface 81 is facing towards the cut direction 91, and its pivot 97 points upwards (here, above the top surface 11 of the sheet goods 10). The block 87 is positioned against the edge 70 for the duration of the cut, allowing for a consistent, guided straight cut in the sheet goods 10 along the cut line 68.

Figure 20:
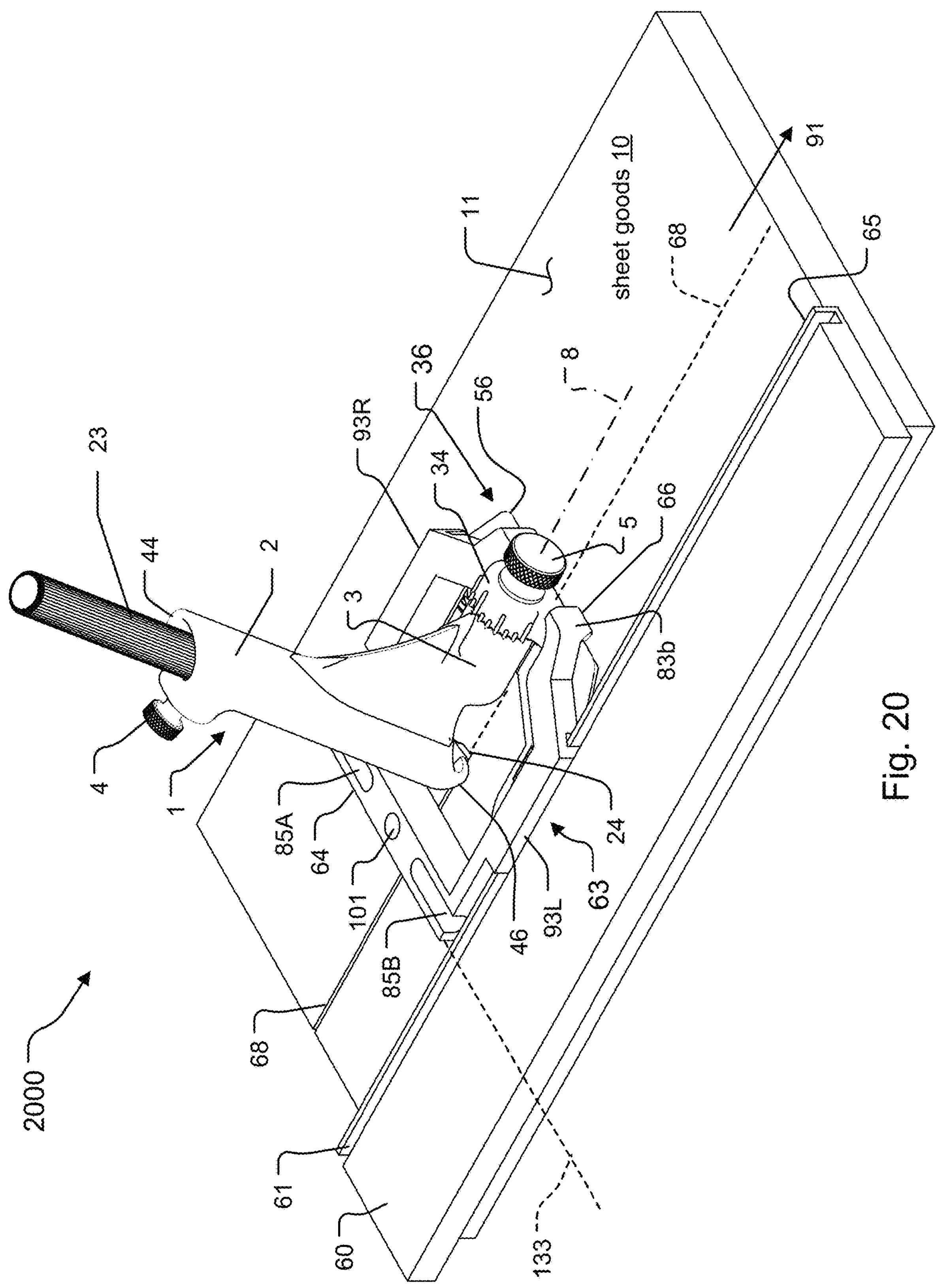
FIG. 20 is an isometric view of another embodiment of the cutting system placed upon a top surface of sheet goods, where a beam component of the guide tool is removed and the guide tool is additionally configured for attachment to a guide rail of the cutting system for enabling the cutting system to provide guided straight cuts in the sheet goods.

FIG. 20 shows another embodiment of the cutting system 2000. The figure depicts how an individual might utilize the cutting system 2000 to make a guided straight cut in an instance of sheet goods 10. In this embodiment, the flange 63 is fastened to the base 36, but beam 82 is removed from the flange 63. The cutting system 2000 additionally includes a mat cutter guide rail ("guide rail") 60 placed upon the top surface 11 of the sheet goods 10.

The guide rail 60 is rectangular and elongated in shape and includes a recess 61 formed within the guide rail 60. The recess 61 runs along the length of the guide rail 60 and is located adjacent to a guided edge 65 of the guide rail 60. The guide rail 60 is arranged with respect to the sheet goods 10 such that the recess 61 faces upward and the guided edge 65 faces and runs parallel to the cut line 68.

In the illustrated example, the sheet goods 10 is oriented in a similar fashion as that in FIG. 19. The guided edge 65 of the guide rail 60 faces away from the viewer towards the cut line 68. The individual then places the left overhang 93L of the flange 63 into the recess 61 such that the overhang 93L seats within/engages with the recess 61 and guided edge 65 of the guide rail 60, with the back 56 of the base 36 facing the individual. This allows the cutting device 100 and the flange 63 of the cutting system 2000 to move in a straight, guided fashion with respect to the guide rail 60. The individual then adjusts the guide rail 60 and the cutting device 100/flange 63 such that the blade 24 of the cutting device 100 aligns with the cut line 68 and the guided edge 65 of the guide rail 60 is parallel to the cut line 68. The individual then makes the cut by moving/pulling the cutting device 100 and its attached guide tool 700 as a unit in the cut direction 91, in a similar fashion as in FIG. 19.

It can also be appreciated that the right overhang 93R of the flange 63 of the cutting device 100, in conjunction with the guide rail 60, also enables the cutting system 2000 to make guided straight cuts in the sheet goods 10. Here, the guide rail 60 is arranged such that its guided edge 65 faces towards the viewer (and towards the cut line 68). The right overhang 93R seats within/engages with the recess 61 and guided edge 65 of the guide rail 60.

Figure 21:
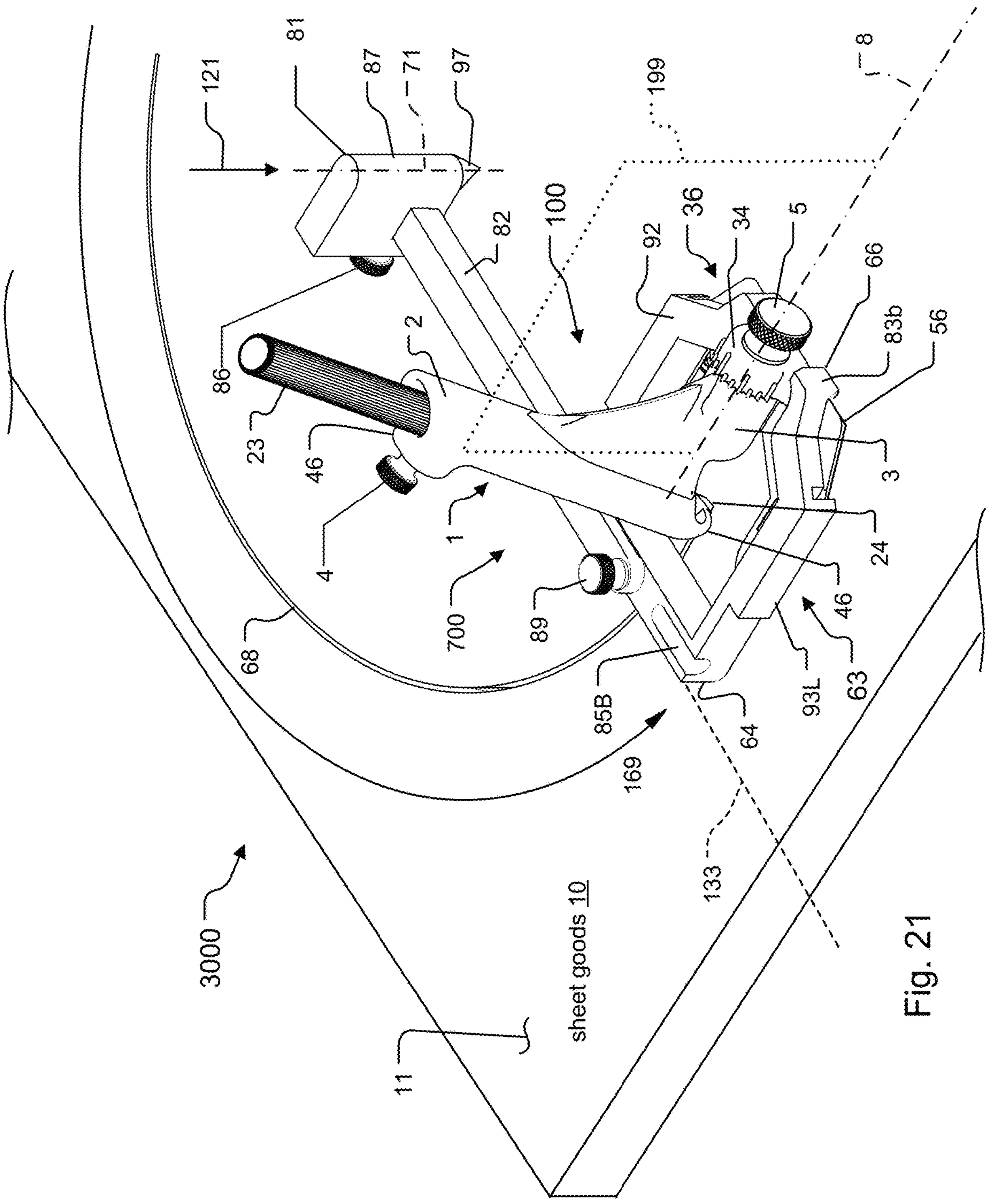
FIG. 21 is an isometric view of yet another embodiment of a cutting system placed on a top surface of an instance of sheet goods, where the guide tool is instead configured for making circular cuts in the sheet goods.

FIG. 21 shows yet another embodiment of the cutting system 3000. The cutting system 3000 can be used to make circular cuts in the sheet goods 10. The cutting system 3000 includes all of the same components as in the cutting system 1000 of FIG. 19, with the exception that the block 87 is arranged differently.

In more detail, the block 87 is attached to the beam 82 such that its conical pivot 97 faces downward towards the top surface 11 of the sheet goods 10. For this purpose, with reference to the cutting system 1000 in FIG. 19, the individual loosens the block fastening knob 86 and removes the block 87 from the beam 82. The individual then flips the block 87 over such that the pivot 97 faces downward towards the top surface 11 of the sheet goods 10. The individual passes the block 87 via its rectangular-shaped opening onto the beam 82, and tightens the block fastening knob 86 to secure the block 87 to the beam 82.

The individual makes circular cuts using the cutting system 3000 by first pressing down upon the block 87 with one hand, in the direction indicated by reference 121, which presses the pivot 97 somewhat into the top surface 11 of the goods 10. An axis of rotation 71 of the cutting system 3000 runs substantially vertically through the center of the pivot 97, is perpendicular to the plane 9 of the base 36/the top surface 11 of the sheet goods 10, and is parallel to the reference plane 199. The individual holds the grip 1 of the cutting system 3000 with their other hand. The individual then rotates the cutting system 3000 around the axis of rotation 71 to effect the guided circular cut. In the illustrated example, the cutting system 3000 makes a guided circular cut in the sheet goods, in a direction indicated by reference 169, along the cut line 68.

In each of the foregoing embodiments of the cutting device, the grip bottom portion 3, the boss 34 and the grip holding mechanism 5 form a rotating mechanical joint that can fix the position of the grip 1 relative to the base 36. It can also be appreciated that similar functionality as provided by the splined features could be provided via a mechanical ball and detent mechanism included between or otherwise formed across the grip bottom portion 3 and the boss 34. Here, the ball and detent allows the grip 1 to rotate relative to the base 36 along the grip axis 8, where the ball and detent are configured to provide rotation of the grip 1 in fixedly moveable increments of as few as two (2) degrees, possibly five (5) degrees or as much as fifteen (15) degrees.

As noted herein above, the base 36 is the same across all embodiments of the cutting device 100, 200, 300, 400, 500, and the bottom portion 3 of the grip 1 in all of the embodiments of the cutting device interfaces with and fixedly rotates with respect to the boss 34 in a substantially similar way. It can also be appreciated that any of the embodiments of the cutting device 100, 200, 300, 400, 500 can be included in or otherwise utilized with any of the embodiments of the cutting system 1000, 2000 and 3000. The guide tool 700 is also configured for attachment to all embodiments of the cutting device.

While this invention has been particularly shown and described with references to preferred embodiments thereof, it will be understood by those skilled in the art that various changes in form and details may be made therein without departing from the scope of the invention encompassed by the appended claims.

What is claimed is:

1. A cutting device for cutting sheet goods, the cutting device comprising:
- a base including a bottom portion and a boss that is atop the bottom portion, wherein the bottom portion sits on a top surface of the sheet goods, and wherein the bottom portion lay parallel to a top plane of the sheet goods, and wherein the top plane of the sheet goods is also known as a plane of the base; and
- a grip including:
  - a grip bottom portion that is rotatably attached to the boss, wherein the grip is configured to rotate relative to the boss along a grip axis that passes through the grip bottom portion and the boss, and wherein the grip axis is substantially parallel to the plane of the base; and
  - a grip top portion having a distal end that faces the sheet goods and is located near a front of the base, wherein the grip top portion holds a blade that extends outward from the distal end towards the top surface of the sheet goods, and wherein the grip top portion includes a blade holding mechanism to adjustably secure the blade at a desired depth relative to the top surface of the sheet goods, and wherein the blade holding mechanism is a thumbscrew.

2. The cutting device of claim 1, wherein the grip top portion is configured to receive a knife within a cavity formed within the grip top portion, and wherein the knife has a handle to which the blade is attached, and wherein the blade holding mechanism adjustably secures the handle within the cavity at a distance relative to the distal end of the grip top portion to adjustably secure the blade at the desired depth relative to the top surface of the sheet goods.

3. The cutting device of claim 2, wherein the grip top portion includes a stop cup at the distal end for capturing the handle, and wherein the stop cup includes a slotted opening through which the blade passes.

4. The cutting device of claim 1, wherein the grip top portion includes a slot along its length that receives the blade and defines a movement path of the blade, and wherein the blade holding mechanism adjustably secures the blade within the slot at a distance relative to the distal end of the grip top portion to adjustably secure the blade at the desired depth relative to the top surface of the sheet goods.

5. The cutting device of claim 1, wherein the grip top portion has a blade handle channel along its length configured to receive a knife with a body and a retractable blade within the body, and wherein the retractable blade is the blade, and wherein the blade holding mechanism adjustably secures the body of the knife within the blade handle channel at a distance relative to the distal end of the grip top portion to adjustably secure the blade at the desired depth relative to the top surface of the sheet goods.

6. The cutting device of claim 1, wherein the base includes a chamfer that runs along a length of the base to which a guide tool is attachable, wherein the guide tool, when attached to the base via the chamfer, enables the cutting device to make guided straight cuts and circular cuts in the sheet goods.

7. A cutting device for cutting sheet goods, the cutting device comprising:
- a base including a bottom portion and a boss that is atop the bottom portion, wherein the bottom portion sits on a top surface of the sheet goods; and
- a grip including:
  - a grip bottom portion that is rotatably attached to the boss, wherein the grip is configured to rotate relative to the boss along a grip axis that passes through the grip bottom portion and the boss; and
  - a grip top portion having a distal end that faces the sheet goods and is located near a front of the base, wherein the grip top portion holds a blade that extends outward from the distal end towards the top surface of the sheet goods, and wherein the grip top portion includes a blade holding mechanism to adjustably secure the blade at a desired depth relative to the top surface of the sheet goods, and wherein the blade holding mechanism is a thumbscrew;
- wherein the grip is configured to rotate with respect to the boss along the grip axis such that the blade provides beveled cuts in the sheet goods at angles in a range from (−) 75 degrees to 0 degrees relative to the top surface of the sheet goods.

8. A cutting device for cutting sheet goods, the cutting device comprising:
- a base including a bottom portion and a boss that is atop the bottom portion, wherein the bottom portion sits on a top surface of the sheet goods; and
- a grip including:
  - a grip bottom portion that is rotatably attached to the boss, wherein the grip is configured to rotate relative to the boss along a grip axis that passes through the grip bottom portion and the boss; and
  - a grip top portion having a distal end that faces the sheet goods and is located near a front of the base, wherein the grip top portion holds a blade that extends outward from the distal end towards the top surface of the sheet goods, and wherein the grip top portion includes a blade holding mechanism to adjustably secure the blade at a desired depth relative to the top surface of the sheet goods, and wherein the blade holding mechanism is a thumbscrew;

wherein the grip is configured to rotate with respect to the boss along the grip axis such that the blade provides beveled cuts in the sheet goods at angles in a range from 0 degrees to (+) 75 degrees relative to the top surface of the sheet goods.

9. A cutting device for cutting sheet goods, the cutting device comprising:

a base including a bottom portion and a boss that is atop the bottom portion, wherein the bottom portion sits on a top surface of the sheet goods; and a grip including:

a grip bottom portion that is rotatably attached to the boss, wherein the grip is configured to rotate relative to the boss along a grip axis that passes through the grip bottom portion and the boss; and a grip top portion having a distal end that faces the sheet goods and is located near a front of the base, wherein the grip top portion holds a blade that extends outward from the distal end towards the top surface of the sheet goods, and wherein the grip top portion includes a blade holding mechanism to adjustably secure the blade at a desired depth relative to the top surface of the sheet goods, and wherein the blade holding mechanism is a thumbscrew; and a grip holding mechanism that locks a position of the grip bottom portion relative to the boss for securing the grip to the base, wherein the grip holding mechanism is a thumb screw that passes through a hole in the boss and has a threaded end that engages with a threaded hole in the grip bottom portion, and wherein the threaded hole, the hole in the boss and the thumb screw are aligned along the grip axis.

10. A cutting device for cutting sheet goods, the cutting device comprising:

a base including a bottom portion and a boss that is atop the bottom portion, wherein the bottom portion sits on a top surface of the sheet goods; and a grip including:

a grip bottom portion that is rotatably attached to the boss, wherein the grip is configured to rotate relative to the boss along a grip axis that passes through the grip bottom portion and the boss; and a grip top portion having a distal end that faces the sheet goods and is located near a front of the base, wherein the grip top portion holds a blade that extends outward from the distal end towards the top surface of the sheet goods, and wherein the grip top portion includes a blade holding mechanism to adjustably secure the blade at a desired depth relative to the top surface of the sheet goods, and wherein the blade holding mechanism is a thumbscrew;

wherein the grip bottom portion includes a grip splined surface and the boss includes a base splined surface configured to engage with the grip splined surface, and wherein the splined surfaces enable locking rotation of the grip relative to the base, along the grip axis, in fixed degree increments.

* * * * *